United States Patent
Ishibashi et al.

(10) Patent No.: US 7,069,057 B2
(45) Date of Patent: Jun. 27, 2006

(54) CELLULAR PHONE INCLUDING A DISPLAY REVEALED BY REMOVING A REMOVABLE OPERATION UNIT

(75) Inventors: Junichi Ishibashi, Iruma (JP); Yutaka Adachi, Hachioji (JP); Hiroyoshi Kobayashi, Hachioji (JP); Masatoshi Homan, Hino (JP); Toshihiro Kitahara, Tachikawa (JP); Yoichi Iba, Hachioji (JP); Hisanori Tetsuka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 237 days.

(21) Appl. No.: 10/641,352

(22) Filed: Aug. 13, 2003

(65) Prior Publication Data

US 2004/0043799 A1 Mar. 4, 2004

Related U.S. Application Data

(63) Continuation of application No. PCT/JP02/01311, filed on Feb. 15, 2002.

(30) Foreign Application Priority Data

Feb. 15, 2001 (JP) ............................. 2001-038969

(51) Int. Cl.
*H04M 1/00* (2006.01)
*G03B 21/14* (2006.01)

(52) U.S. Cl. ............... 455/566; 455/455; 455/575.1; 455/557; 455/550.1; 353/119; 353/79

(58) Field of Classification Search ............ 455/575.1, 455/566, 557, 556.1, 550.1; 353/119, 79
See application file for complete search history.

(56) References Cited

U.S. PATENT DOCUMENTS

| 4,871,997 | A | * | 10/1989 | Adriaenssens et al. . 340/539.23 |
| 5,048,077 | A | | 9/1991 | Wells et al. |
| 5,930,724 | A | | 7/1999 | Yanagida |
| 5,970,418 | A | | 10/1999 | Budd et al. |
| 6,637,896 | B1 | * | 10/2003 | Li et al. ..................... 353/119 |
| 2001/0011030 | A1 | * | 8/2001 | Kuroda ...................... 455/566 |
| 2002/0082042 | A1 | * | 6/2002 | Mark et al. ................. 455/550 |
| 2005/0059441 | A1 | * | 3/2005 | Miyashita ................ 455/575.1 |

FOREIGN PATENT DOCUMENTS

| EP | 0 928 093 A1 | 7/1999 |
| JP | 05-176039 A | 7/1993 |

(Continued)

*Primary Examiner*—George Eng
*Assistant Examiner*—Wesley Kim
(74) *Attorney, Agent, or Firm*—Frishauf, Holtz, Goodman & Chick, P.C.

(57) ABSTRACT

There is disclosed a cellular phone in which communication of information for a call including a voice is carried out in a communication section for the call, and communication of information which is different from the call information and which includes an image to be displayed is carried out in a communication section for information. A first display section in which the information for the call is displayed, and a second display section in which details of the information including the image to be displayed are enlarged and displayed are disposed in a cellular phone main body. An attachable/detachable operation key for inputting characters or instruction information is disposed so that the key can be attached/detached with respect to the cellular phone main body. The information is transmitted/received between the attachable/detachable operation key and the cellular phone main body by cable or by radio.

20 Claims, 15 Drawing Sheets

FOREIGN PATENT DOCUMENTS

| | | |
|---|---|---|
| JP | 06-276265 A | 9/1994 |
| JP | 09-113801 A | 5/1997 |
| JP | 09-321848 A | 12/1997 |
| JP | 09-331387 A | 12/1997 |
| JP | 10-126467 A | 5/1998 |
| JP | 10-340073 A | 12/1998 |
| JP | 11-331331 A | 11/1999 |
| JP | 2000-253113 A | 9/2000 |
| JP | 2000-349897 A | 12/2000 |
| JP | 2001-036619 A | 2/2001 |

* cited by examiner

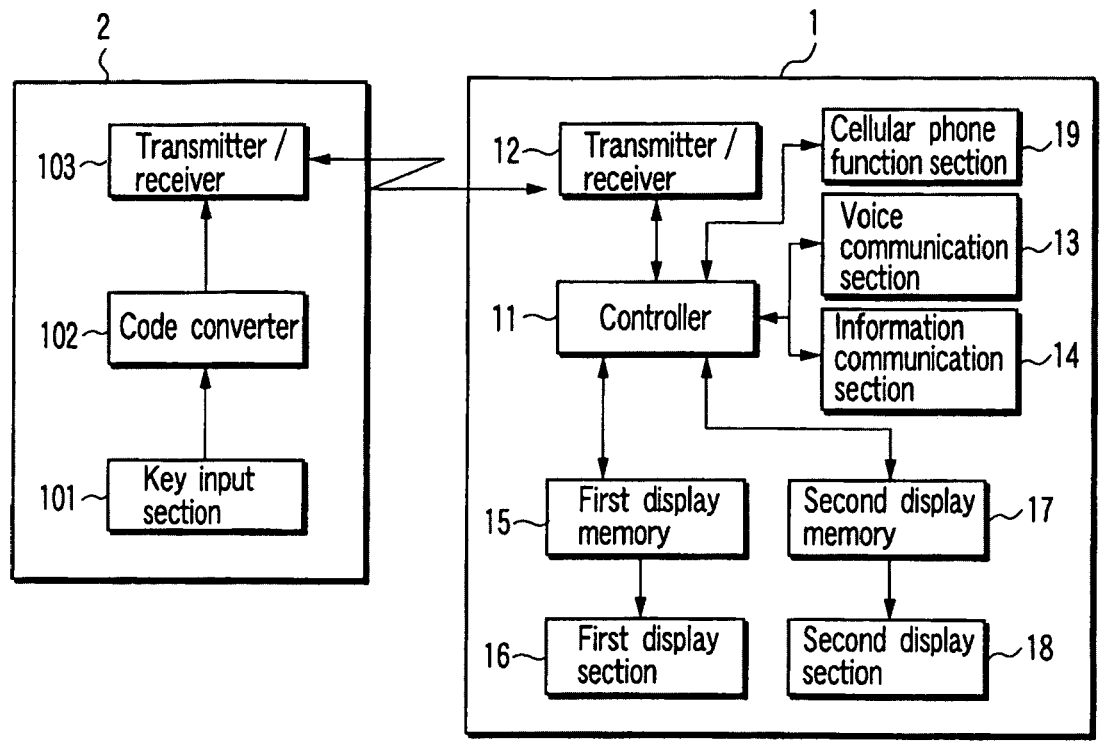
F I G. 1
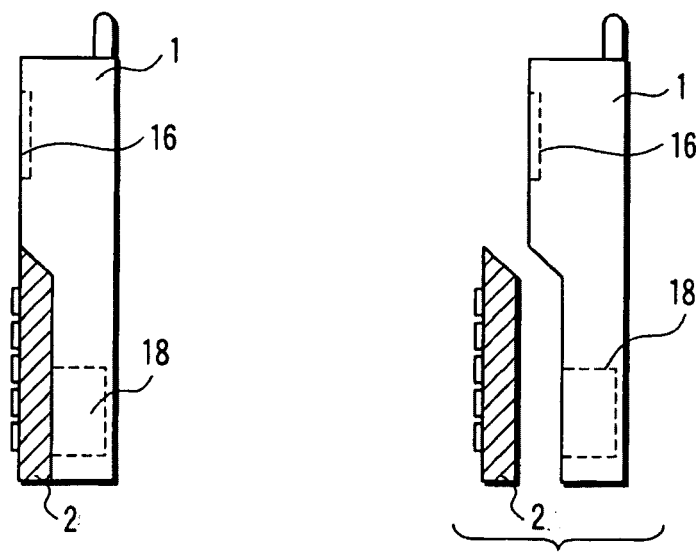
F I G. 2A          F I G. 2B

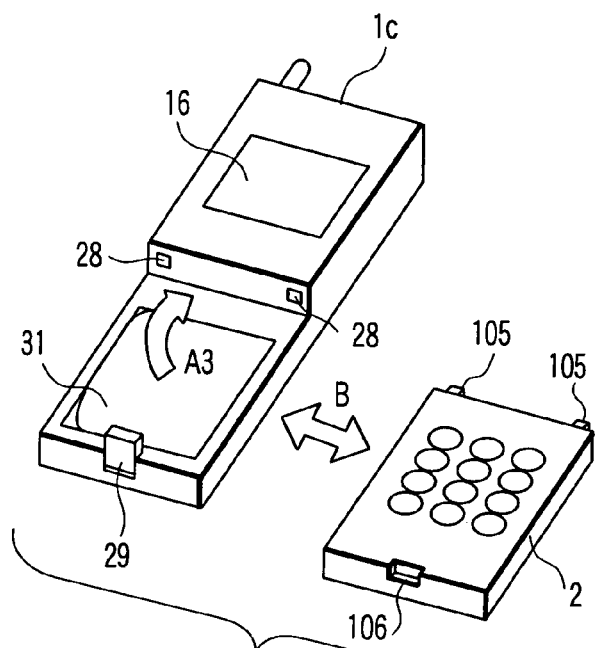
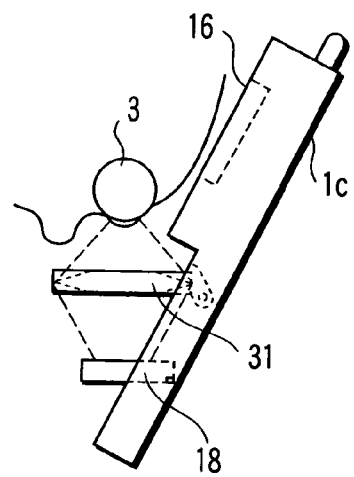
FIG. 5A
FIG. 5B
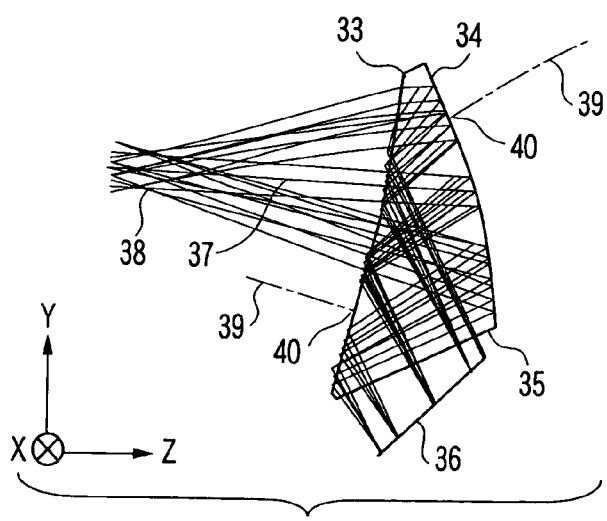
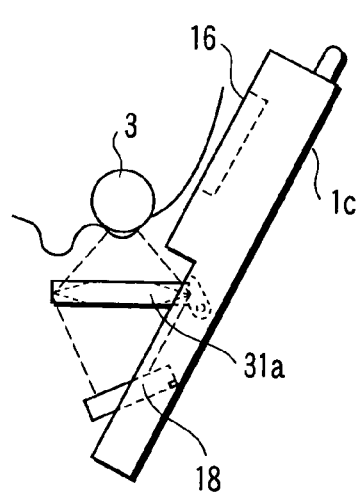
FIG. 6A
FIG. 6B

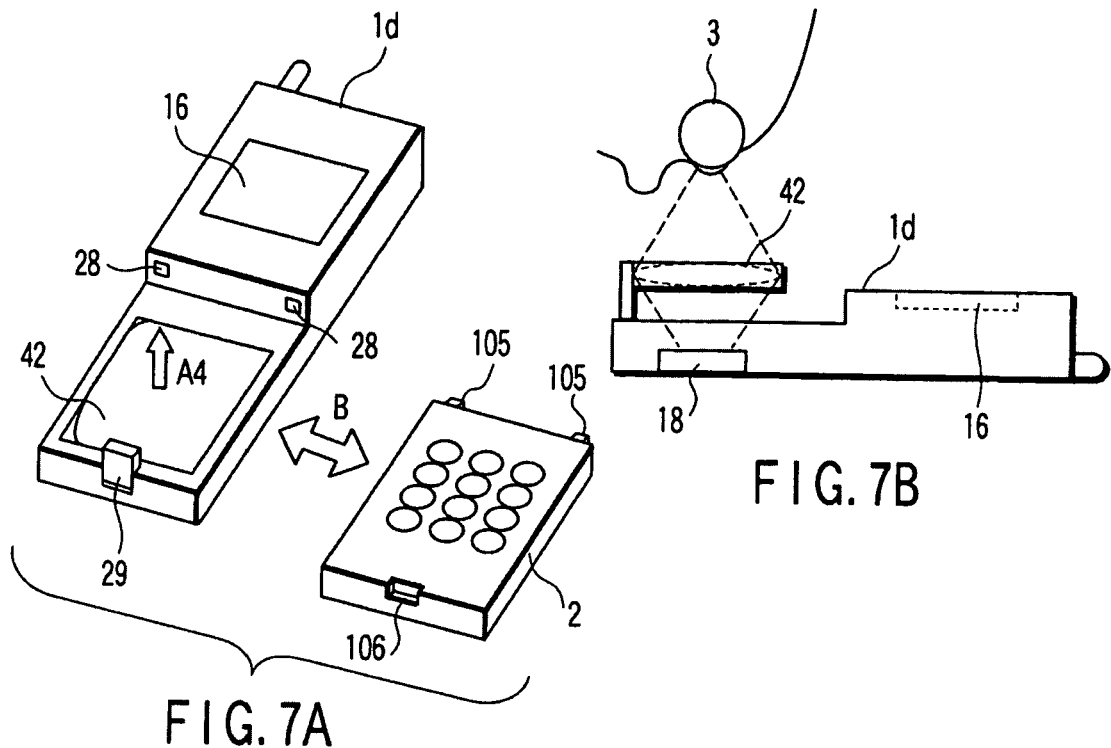
FIG. 7A
FIG. 7B
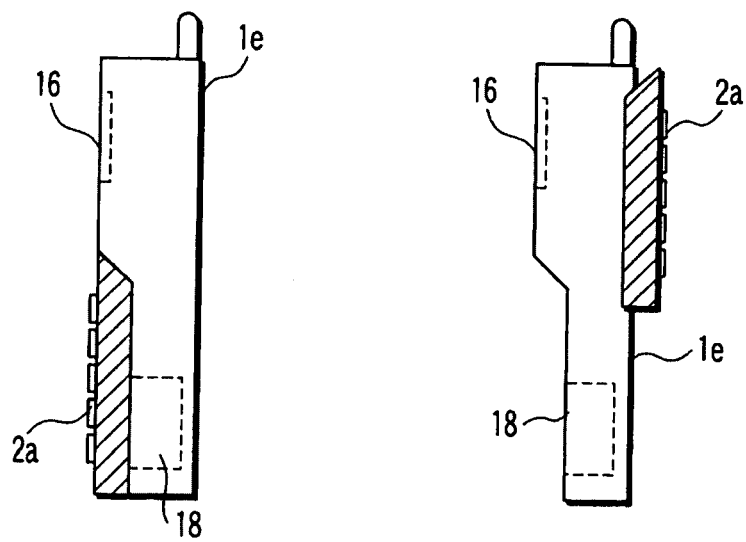
FIG. 8A
FIG. 8B

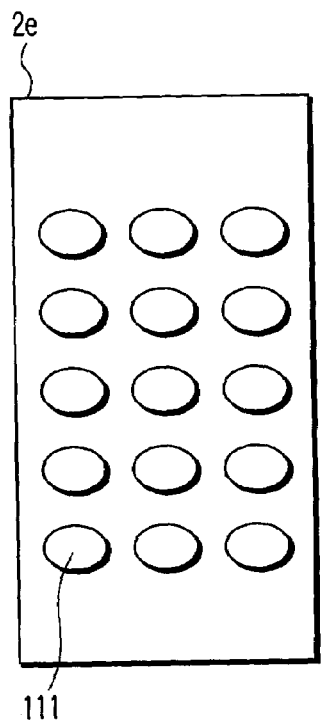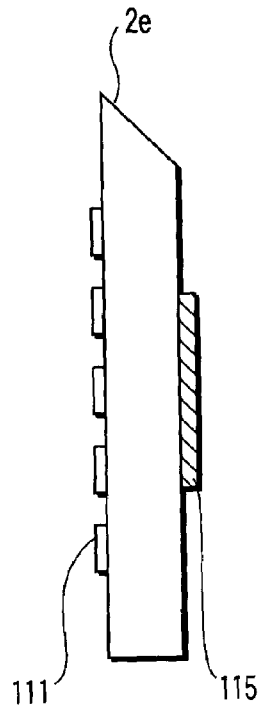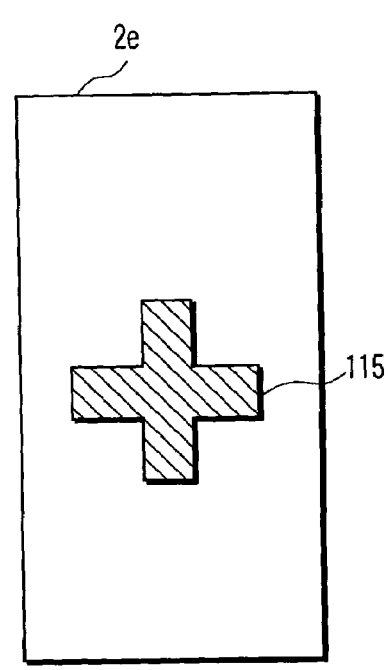
FIG. 17A   FIG. 17B   FIG. 17C
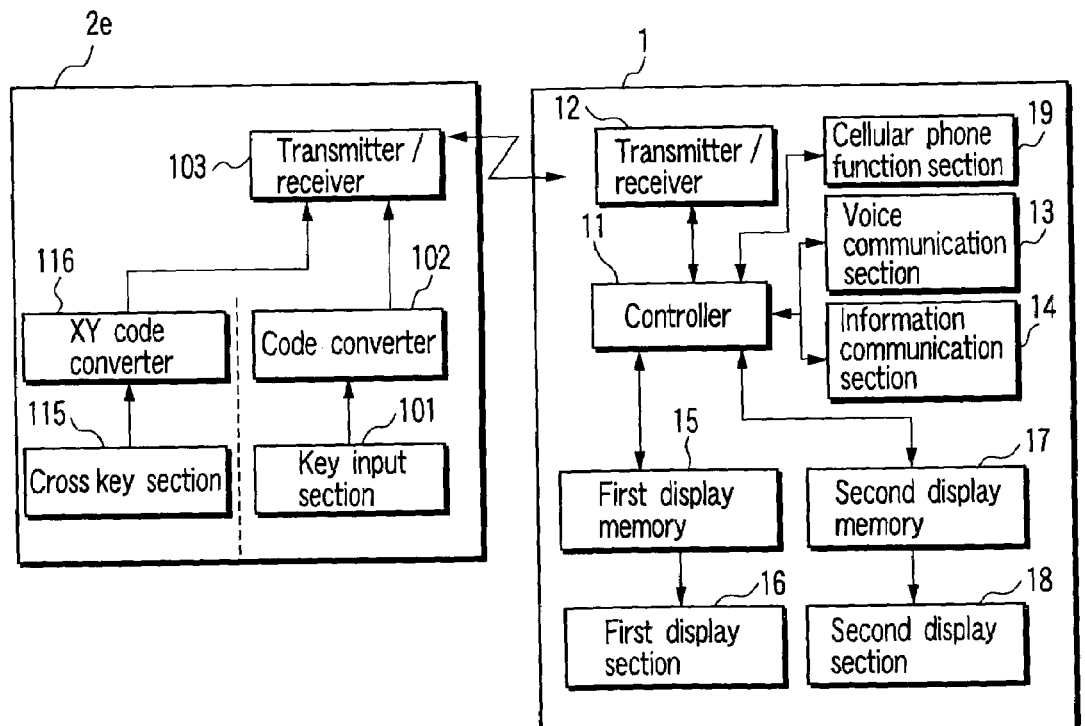
FIG. 18

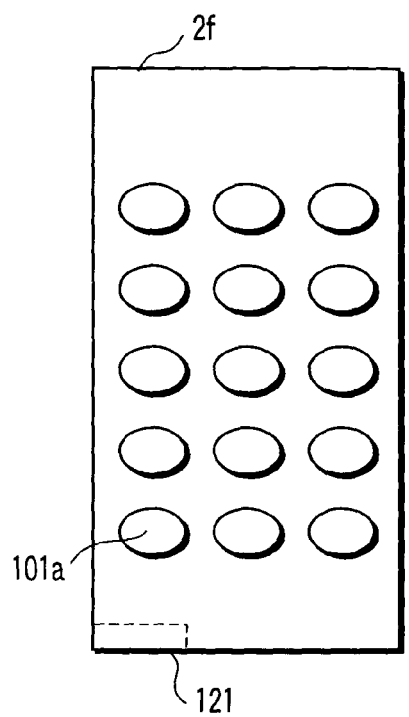 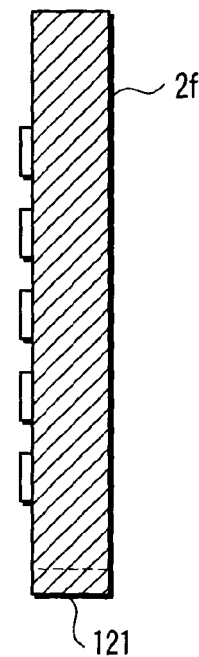
FIG. 20A  FIG. 20B
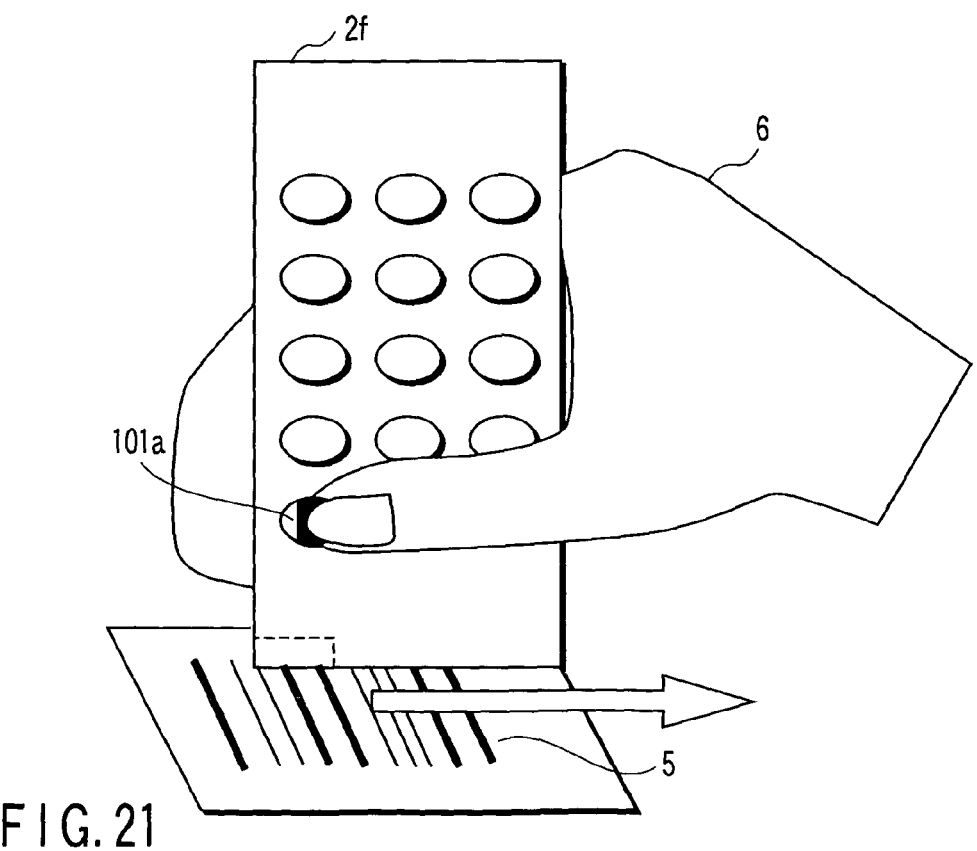
FIG. 21

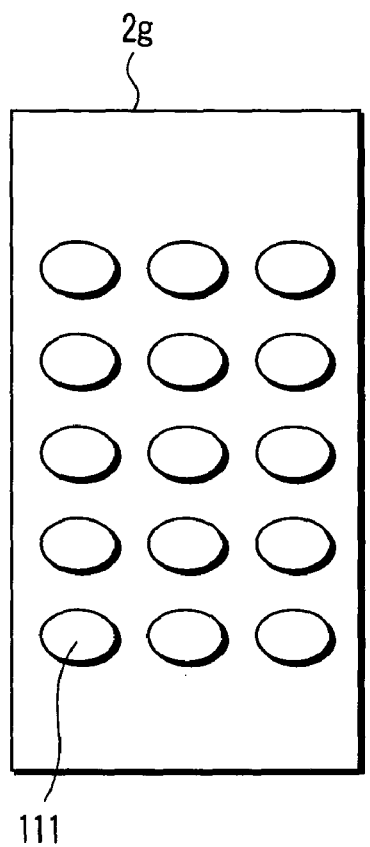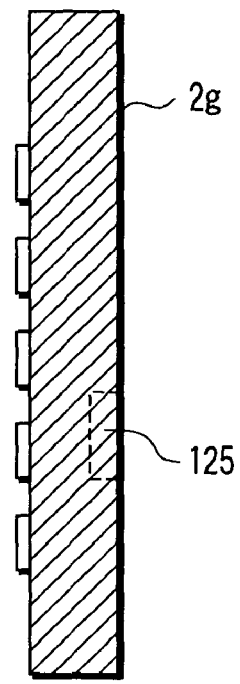
FIG. 23A    FIG. 23B
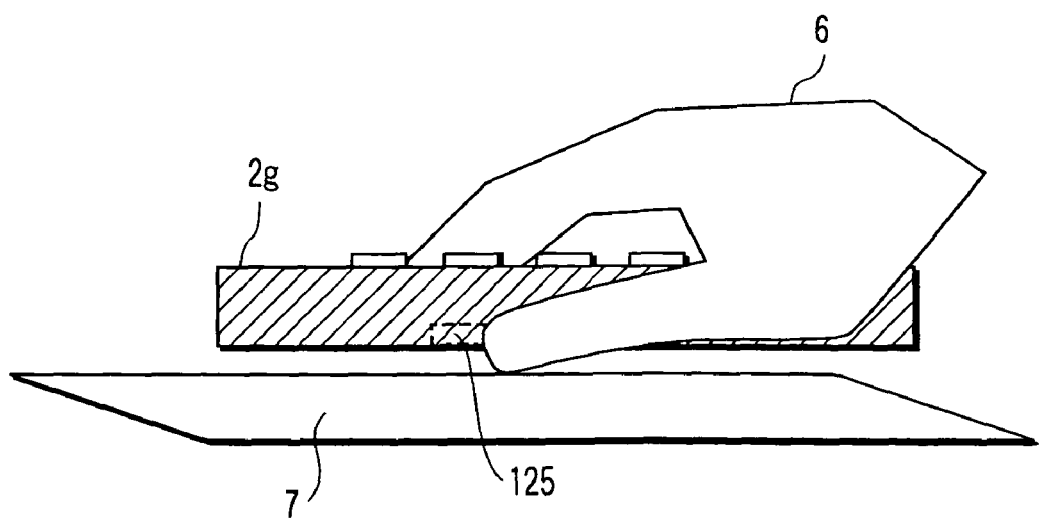
FIG. 24

CELLULAR PHONE INCLUDING A DISPLAY REVEALED BY REMOVING A REMOVABLE OPERATION UNIT

CROSS-REFERENCE TO RELATED APPLICATIONS

This is a Continuation Application of PCT Application No. PCT/JP02/01311, filed Feb. 15, 2002, which was not published under PCT Article 21 (2) in English.

This application is based upon and claims the benefit of priority from the prior Japanese Patent Application No. 2001-038969, filed Feb. 15, 2001, the entire contents of which are incorporated herein by reference.

BACKGROUND OF THE INVENTION

1. Field of the Invention

The present invention relates to a cellular phone, more particularly to improvement in a cellular phone with respect to which an operation key can be attached/detached.

2. Description of the Related Art

The technology of cellular phones relating to enlarged display parts, such as U.S. Pat. No. 5,048,077 (REFLECTION TWCH) and U.S. Pat. No. 5,970,418 (INTERNATIONAL BUSINESS MACHINES), is known.

Moreover, techniques of attaching/detaching operation keys of the cellular phones are described, for example, in Jpn. Pat. Appln. KOKAI Publication Nos. 06-276265 and 09-321848. These publications disclose a constitution of the attaching/detaching of the operation key, and a display section is disposed in an attaching/detaching section. However, the enlarged display section does not exist in a phone main body, and a cooperative function with the operation key for using an enlarged display or the constitution of the enlarged display is not considered.

In recent years, the cellular phones have been used not only for phone calls but also as information data obtaining means, such as an internet homepage browser. For the display, portable information apparatuses such as a personal digital assistant (PDA) are connected to the cellular phones and used. In this case, the cellular phone is also used as a communication modem.

On the other hand, the cellular phones in which enlarged display section are incorporated have also been developed. However, when an operator holds an apparatus and looks at the enlarged display section in performing a character input operation or an instruction operation of a browser for inspection in a keyboard, there is a disadvantage that key buttons cannot be seen in a position of the keyboard disposed in a conventional cellular phone main body. Furthermore, positions of fingers for operating the key buttons cannot meet appropriate positions, thus there is a disadvantage that the phone is difficult to operate.

In consideration of the above-described respects, as a desired use style, it has been proposed that the cellular phone should be held in one hand and a remote controller should be held in the other hand while looking at the enlarged display so as to give operation instructions such as key input.

Moreover, in order to realize the cellular phone capable of being actually felt to include a screen which has a large display easy to see, a constituting size of an optical system for the enlarged display easily tends to be large. In addition, for the position of the enlarged display part, in a conventional usage style, considering a conventional design of a speaker section in the vicinity of an apparatus main body upper section, which is brought onto an ear, such a style that a display part is disposed around the operation key and can be browsed is desirable.

Furthermore, with the usage for making phone calls and the usage for browsing information, the usage style of the cellular phone differs. A compact integral type of style in which mobility is considered is desirable for carrying the apparatus.

Therefore, an object of the present invention is to provide a cellular phone in which an operation key for performing an input operation is not difficult to see, operation instructions can be given, a style at a usage time of the phone is not largely changed, and an apparatus is prevented from being enlarged.

BRIEF SUMMARY OF THE INVENTION

According to a first aspect of the present invention, there is provided a cellular phone characterized by comprising: voice communication means for transmitting and receiving data concerning voice communication and carrying out voice communication; information communication means for transmitting and receiving data concerning information communication and carrying out information communication, which is different from voice communication and includes an image; first display means disposed in a phone main body, for displaying the data concerning voice communication; second display means for enlarging and displaying details of the data concerning information communication; operation means, removably attached to the phone main body, for inputting instructions including characters; and transmission/reception means for transmitting/receiving information between the operation means and the phone main body.

Moreover, according to a second aspect of the invention, there is provide a cellular phone comprising: a voice communication section which carries out communication of information for the call including voice; an information communication section information which carries out the communication of the information other than the call information, including an image to be displayed; a first display section which is disposed in a phone main body to display the information for the call; a second display section which enlarges and displays details of the information including the image to be displayed; an operation key which is attachable/detachable with respect to the phone main body and which inputs character or instruction information; and a transmission/reception section which transmits/receives the character or instruction information between the operation key and the phone main body.

BRIEF DESCRIPTION OF THE SEVERAL VIEWS OF THE DRAWING

FIG. 1 is a block diagram showing a constitution of a first embodiment of a cellular phone according to the present invention;

FIGS. 2A and 2B show an appearance of the cellular phone according to the first embodiment of the present invention, FIG. 2A is a side view showing that an attachable/detachable operation key 2 is attached to a cellular phone main body 1, and FIG. 2B is a side view showing that the attachable/detachable operation key 2 is detached from the cellular phone main body 1;

FIG. 3A is a side view showing that the attachable/detachable operation key 2 is attached to a cellular phone main body 1*a*, and FIG. 3B is a side view showing that the attachable/detachable operation key 2 is detached from the cellular phone main body 1*a*;

FIG. 4A is a perspective view showing that the attachable/detachable operation key 2 is detached from a cellular phone main body 1*b* and a magnification reflective mirror section 24 is contained, and FIG. 4B is a side view showing that the attachable/detachable operation key 2 is detached from the cellular phone main body 1*b* and the magnification reflective mirror section 24 is opened;

FIGS. 5A and 5B show the appearance of the cellular phone according to a fourth embodiment of the present invention, FIG. 5A is a perspective view showing that the attachable/detachable operation key 2 is detached from a cellular phone main body 1*c* and a magnification optical part 31 is contained, and FIG. 5B is a side view showing that the attachable/detachable operation key 2 is detached from the cellular phone main body 1*c* and the magnification optical part 31 and a second display part 18 are popped up;

FIGS. 6A and 6B show a modification example of the fourth embodiment of the present invention, FIG. 6A is a diagram showing an optical system which replaces the magnification optical part 31 of FIGS. 5A and 5B, and FIG. 6B is a diagram showing the appearance of the cellular phone main body in which the optical system of FIG. 6A is used;

FIGS. 7A and 7B show the appearance of the cellular phone according to a fifth embodiment of the present invention, FIG. 7A is a perspective view showing that the attachable/detachable operation key 2 is detached from a cellular phone main body 1*d* and a magnification optical section 42 is contained, and FIG. 7B is a side view showing that the attachable/detachable operation key 2 is detached from the cellular phone main body 1*d* and the magnification optical part 42 are turned out;

FIGS. 8A and 8B show the appearance of the cellular phone according to a sixth embodiment of the present invention, FIG. 8A is a side view showing that the attachable/detachable operation key 2 is attached on a surface side of a cellular phone main body 1*e*, and FIG. 8B is a side view showing that the attachable/detachable operation key 2 is attached to the cellular phone main body 1*e* on a rear surface side;

FIG. 9A is a block diagram showing a constitution in which an attachable/detachable operation key 2*a* is detached from the cellular phone main body 1*e*, and FIG. 9B is a block diagram showing the constitution in which the attachable/detachable operation key 2*a* is attached to the cellular phone main body 1*e* on the rear surface side;

FIG. 10A is a block diagram showing the constitution in which an attachable/detachable operation key 2*b* is attached to a cellular phone main body 1*f*, and FIG. 10B is a block diagram showing the constitution in which the attachable/detachable operation key 2*b* is detached from the cellular phone main body 1*f*;

FIG. 11A is a side view showing that the attachable/detachable operation key 2*b* is attached to a cellular phone main body 1*g*, and FIG. 11B is a side view showing that the attachable/detachable operation key 2*b* is detached from the cellular phone main body 1*g*;

FIG. 12A is a block diagram showing the constitution in which the attachable/detachable operation key 2*b* is attached to the cellular phone main body 1*g*, and FIG. 12B is a block diagram showing the constitution in which the attachable/detachable operation key 2*b* is detached from the cellular phone main body 1*g*;

FIG. 15A is a plan view showing the surface side, FIG. 15B is a side view, and FIG. 15C is a plan view showing the rear surface side;

FIGS. 17A to 17C show the appearance configuration of the attachable/detachable operation key according to a modification example of the eleventh embodiment of the present invention, FIG. 17A is a plan view showing the surface side, FIG. 17B is a side view, and FIG. 17C is a plan view showing the rear surface side;

FIG. 18 is a block diagram showing the constitution of the cellular phone according to the modification example of the eleventh embodiment of the present invention;

FIGS. 20A and 20B show the appearance configuration of the attachable/detachable operation key according to a twelfth embodiment of the present invention, FIG. 20A is a plan view showing the surface side, and FIG. 20B is a side view;

FIG. 21 is a diagram showing an example in which an attachable/detachable operation key 2*f* according to the twelfth embodiment of the present invention is used as a barcode reader;

FIGS. 23A and 23B show the appearance configuration of the attachable/detachable operation key according to a thirteenth embodiment of the present invention, FIG. 23A is a plan view showing the surface side, and FIG. 23B is a side view; and FIG. 24 is a diagram showing an example in which an attachable/detachable operation key 2*g* according to the thirteenth embodiment of the present invention is used as an optical pointing device (mouse).

BEST MODE FOR CARRYING OUT INVENTION

Figures 3A, 3B:
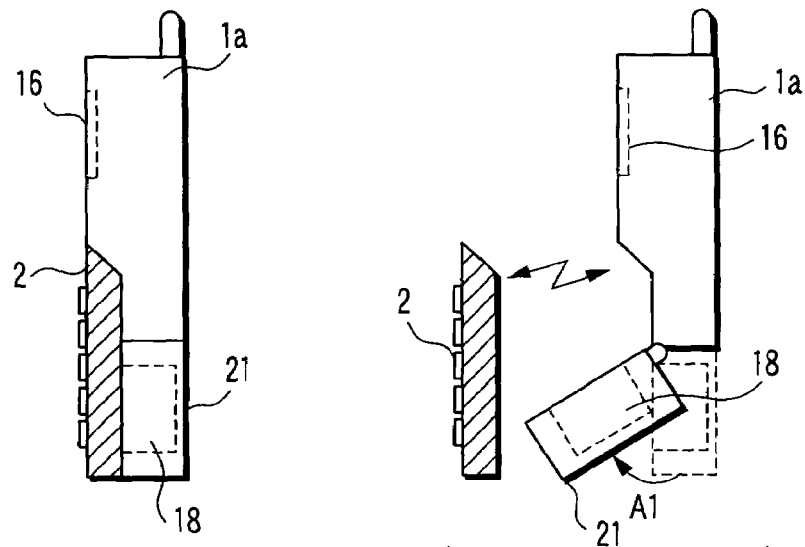
FIGS. 3A and 3B show the appearance of the cellular phone according to a second embodiment of the present invention.

Embodiments of the present invention will be described hereinafter with reference to the drawings.

FIG. 1 is a block diagram showing a constitution of a first embodiment of a cellular phone according to the present invention.

In FIG. 1, the cellular phone is constituted of a cellular phone main body 1, and an attachable/detachable operation key 2 which is an operation keyboard attachable/detachable with respect to the cellular phone main body 1.

The cellular phone main body 1 includes: a controller 11 for executing a control inside the cellular phone main body 1; a transmitter/receiver 12 for transmitting/receiving information with respect to the attachable/detachable operation key 2; a voice communication section 13 for making the call with voice by a user; an information communication section 14 which has a modem function to perform information communication of an internet homepage, and the like; a first display memory 15 for a first display section 16; the first display section 16; a second display memory 17 for a second display section 18; the second display section 18; and a cellular phone function section 19 which has a phone function required for the cellular phone, such as a battery (not shown).

The controller 11 executes a whole control inside the cellular phone main body 1 including a general process in the cellular phone, a browser process for browsing an internet homepage, a process similar to that of a usual personal computer, a communication process, and the like.

Moreover, the first display section 16 is a standard display section for checking a phone number or a small amount of characters of a communication destination, and the second display section 18 is an enlarged display part for watching the internet homepage with an enlarged highly fine image. Furthermore, the first display memory 15 and second display memory 17 are disposed to store information displayed in the first display section 16 and second display section 18.

On the other hand, the attachable/detachable operation key 2 is constituted of: a key input section 101 for inputting a phone number or various types of information in accordance with various types of operation keys; a code converter 102 for pressing a key button of the operation key to convert a key action into data; and a transmitter/receiver 103 for transmitting a signal converted by the code converter 102 to a cellular phone main body 1 side.

It is to be noted that although not shown in FIG. 1, the attachable/detachable operation key 2 side includes a small CPU because of a small processing amount, or a structure in which a processable control is executed without disposing the CPU.

Moreover, a wire such as a cable or radio is used in transmitting a key input signal between the cellular phone main body 1 and attachable/detachable operation key 2.

FIGS. 2A and 2B show an appearance of the cellular phone according to the present embodiment, FIG. 2A is a side view showing that the attachable/detachable operation key 2 is attached to the cellular phone main body 1, and FIG. 2B is a side view showing that the attachable/detachable operation key 2 is detached from the cellular phone main body 1.

As shown in FIG. 2A, in the state in which the attachable/detachable operation key 2 is attached to the cellular phone main body 1, the first display section 16 which is a standard display monitor for the call is disposed in one surface of the cellular phone main body 1 on the same plane as that of the attachable/detachable operation key 2. The second display section 18 which is an enlarged display monitor is disposed in the cellular phone main body 1, and is prevented from being seen from the outside while the attachable/detachable operation key 2 is attached to the cellular phone main body 1.

Moreover, as shown in FIG. 2B, when the attachable/detachable operation key 2 is detached from the cellular phone main body 1, the second display section 18 is exposed to the outside. The second display section 18 is constituted of the enlarged display monitor, for example, in which an internet homepage, and the like can be browsed by an image size of a video graphics array (VGA; 640×480 dots or more resolution), or a super video graphics array (SVGA; 800×600 dots or more resolution).

The enlarged display generally has a looking-into style, and the user brings the cellular phone main body 1 close to his/her eyes. Therefore, in general, when the information is browsed in the enlarged display, to perform a key operation while looking at enlarged display information is a style difficult to operate. For example, when the user holds the cellular phone main body in his left hand while looking at the enlarged display, and operates the keys with his right hand, the cellular phone should be separated for ease of use.

To solve the problem, as shown in FIG. 2B, the attachable/detachable operation key 2 can be detached from the cellular phone main body 1. Detailed information is seen in the enlarged display. Therefore, the attachable/detachable operation key 2 is detached from the cellular phone main body 1 so that the second display section 18 can visually be recognized. Moreover, while watching the second display section 18, the key is operated by the detached attachable/detachable operation key 2.

Moreover, the input operation of the phone number before making the call is performed in the operation key while watching the first display section 16 as the standard display monitor in the state in which the attachable/detachable operation key 2 is attached to the cellular phone main body 1.

Next, a second embodiment of the present invention will be described.

FIGS. 3A and 3B show the appearance of the cellular phone according to the second embodiment of the present invention, FIG. 3A is a side view showing that the attachable/detachable operation key 2 is attached to a cellular phone main body 1a, and FIG. 3B is a side view showing that the attachable/detachable operation key 2 is detached from the cellular phone main body 1a.

It is to be noted that in the embodiment described hereinafter, the same part as that of the above-described first embodiment is denoted with the same reference numerals and the description is omitted.

As shown in FIG. 3A, the first display section 16 which is the standard display monitor for the call is disposed in one surface of the cellular phone main body 1a on the same plane as that of the attachable/detachable operation key 2 in the state in which the attachable/detachable operation key 2 is attached to the cellular phone main body 1a. The second display section 18 which is the enlarged display monitor is disposed in a main body movable section 21 of the cellular phone, and is prevented from being seen from the outside in the state in which the attachable/detachable operation key 2 is attached to the cellular phone main body 1a.

Moreover, as shown in FIG. 3B, when the attachable/detachable operation key 2 is detached from the cellular phone main body 1 the second display section 18 is exposed to the outside. In addition, the main body movable section 21 is disposed so as to pop up in an arrow $A_1$ direction using an attachment connection (not shown) in the cellular phone main body 1a as an axis, when the attachable/detachable operation key 2 is detached from the cellular phone main body 1a.

Accordingly, as shown in FIG. 3A, the input operation of the phone number before making the call is performed with the operation key while watching the first display section 16 as the standard display monitor in the state in which the attachable/detachable operation key 2 is attached to the cellular phone main body 1a.

On the other hand, to see the detailed information by the enlarged display, as shown in FIG. 3B, the attachable/detachable operation key 2 is detached from the cellular phone main body 1a, and further the main body movable section 21 is popped up in the shown arrow $A_1$ direction, and is set in a bent state from the surface part of the cellular phone main body 1a. Therefore, the second display section 18 can be easily seen. Subsequently, while watching the second display section 18, the key operation by the detached attachable/detachable operation key 2 is performed.

Next, a third embodiment of the present invention will be described.

Figures 4A, 4B:
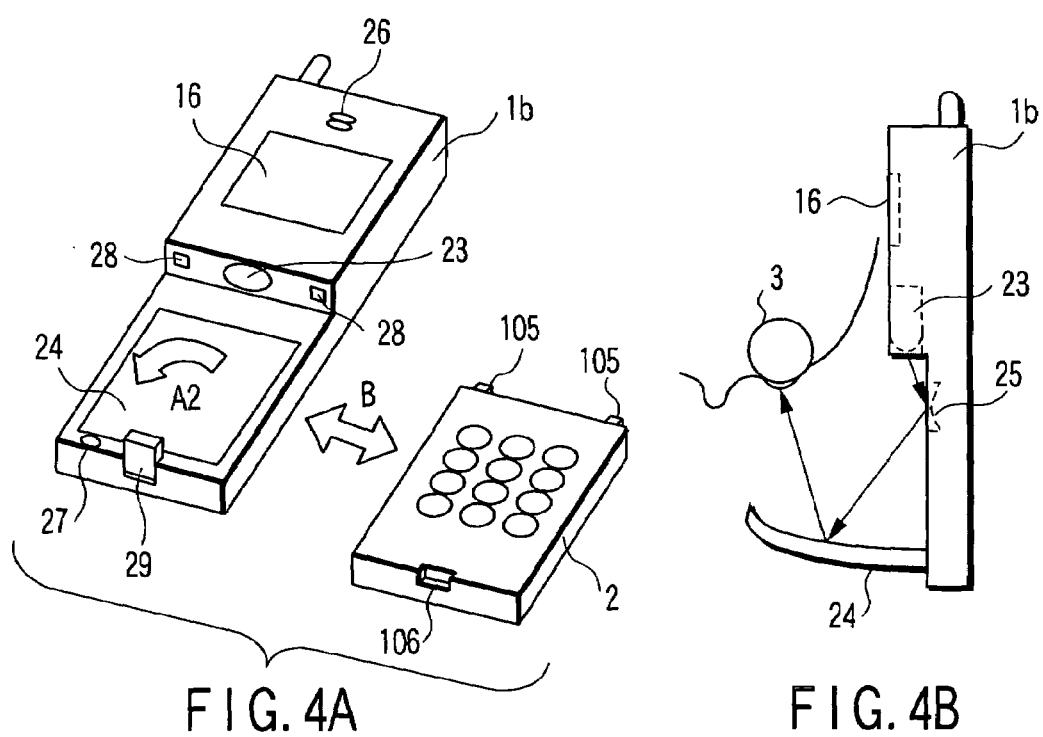
FIGS. 4A and 4B show the appearance of the cellular phone according to a third embodiment of the present invention.

FIGS. 4A and 4B show the appearance of the cellular phone according to the third embodiment of the present invention, FIG. 4A is a perspective view showing that the attachable/detachable operation key 2 is detached from a cellular phone main body 1b and a magnification reflective mirror part 24 is contained, and FIG. 4B is a side view showing that the attachable/detachable operation key 2 is detached from the cellular phone main body 1b and the magnification reflective mirror section 24 is opened.

In FIG. 4A, the first display section 16 which is the standard display monitor for the call, and a speaker 26 for outputting sound are disposed in one surface of the cellular phone main body 1b on one plane of the cellular phone main body 1b. As shown by an arrow B, the magnification reflective mirror section 24 turned out in a shown arrow $A_2$ direction is contained in a part to which the detached attachable/detachable operation key 2 is to be attached on the cellular phone main body 1b. Moreover, in general, the magnification reflective mirror section 24 is disposed so as to open in the shown arrow $A_2$ direction using the attaching part (not shown) in the cellular phone main body 1b as the axis, when the attachable/detachable operation key 2 is detached from the cellular phone main body 1b.

Furthermore, a projection display section 23 for displaying information in the magnification reflective mirror section 24, and a microphone 27 for inputting voice are disposed in the cellular phone main body 1b. Concave section 28 and a holder 29 for mounting the attachable/detachable operation key 2 are formed. These concave sections 28 and holder 29 engage with engaging pawls 105 and an engagement section 106, respectively, so that the attachable/detachable operation key 2 is prevented from being detached from the cellular phone main body 1b.

The input operation of the phone number before making the call is performed with the operation key while watching the first display section 16 as the standard display monitor in either the state in which the attachable/detachable operation key 2 is attached to the cellular phone main body 1b or the state in which the key is detached.

On the other hand, the detailed information displayed by the enlarged display is seen as shown in FIG. 4B. That is, when the engagement between the holder 29 and the engagement section 106 of the attachable/detachable operation key 2 is released, and the attachable/detachable operation key 2 is detached from the cellular phone main body 1b, the magnification reflective mirror section 24 is opened in the shown arrow $A_2$ direction of FIG. 4A. In this state, light projected by the projection display section 23 is reflected by a primary reflective mirror section 25 disposed in the cellular phone main body 1b, and subsequently guided into the magnification reflective mirror section 24. Subsequently, the light reflected again by the magnification reflective mirror part 24 is taken into user's eyes 3.

Therefore, the detailed information displayed by the enlarged display can easily be browsed by the projection display section 23, primary reflective mirror section 25, and magnification reflective mirror section 24. Subsequently, while watching the detailed information displayed in the magnification reflective mirror section 24, the key operation by the detached attachable/detachable operation key 2 is performed.

It is to be noted that in the third embodiment, when the cellular phone main body 1b is grasped with the right hand and with the left hand, a vertical direction of the image (information) displayed in the magnification reflective mirror section 24 is inverted. Therefore, the image (information) displayed in the projection display section 23 has to be vertically inverted. For this technique, for example, a technique disclosed in Jpn. Pat. Appln. KOKAI Publication No 10-340073 can be used.

FIGS. 5A and 5B show the appearance of the cellular phone according to a fourth embodiment of the present invention, FIG. 5A is a perspective view showing that the attachable/detachable operation key 2 is detached from a cellular phone main body 1c and a magnification optical section 31 is contained, and FIG. 5B is a side view showing that the attachable/detachable operation key 2 is detached from the cellular phone main body 1c and the magnification optical section 31 and second display section 18 are popped up.

In FIG. 5A, the first display section 16 which is the standard display monitor for the call is disposed in one surface of the cellular phone main body 1c on one plane of the cellular phone main body 1c. As shown by an arrow B, the magnification optical section 31 popped up in a shown arrow $A_3$ direction and the second display section 18 for the enlarged display (see FIG. 5B) are contained in a part to which the detached attachable/detachable operation key 2 is to be attached on the cellular phone main body 1c.

The magnification optical section 31 and second display section 18 are generally disposed so as to pop up using the attaching part (not shown) in the cellular phone main body 1c as the axis as shown in FIG. 5B, when the attachable/detachable operation key 2 is detached from the cellular phone main body 1c. Moreover, the magnification optical part 31 and second display section 18 are fixed in a position where the parts extend in parallel with each other on popping up.

It is to be noted that the magnification optical section 31 includes a lens which has a predetermined refractive index, and the transmitter/receiver 12 is constituted of display devices such as an LCD.

Moreover, the input operation of the phone number before making the call is performed with the operation key while watching the first display section 16 as the standard display monitor in either the state in which the attachable/detachable operation key 2 is attached to the cellular phone main body 1c or the detached state.

On the other hand, to see the detailed information by the enlarged display, the attachable/detachable operation key 2 is detached from the cellular phone main body 1c. Then, the magnification optical section 31 and second display section 18 pop up in the shown arrow $A_3$ direction of FIG. 5A. In this state, the detailed information displayed in the second display section 18 is enlarged by the magnification optical section 31, and taken into user's eyes 3.

Therefore, by the second display section 18 and magnification reflective mirror section 24, the detailed information by the enlarged display is reflected in a position where the user can easily browse the information. Moreover, while watching the detailed information displayed in the second display section 18 via the magnification optical section 31, the key operation is performed by the detached attachable/detachable operation key 2.

It is to be noted that, needless to say, the constitutions of the magnification optical section 31 and second display section 18 are not limited to the structures shown in FIGS. 5A and 5B, and can be constituted using another optical system.

For example, instead of the magnification optical part 31 of FIGS. 5A and 5B, the optical system disclosed in Jpn. Pat. Appln. KOKAI Publication No. 09-113801 and shown in FIG. 6A may also be used. This optical system includes three planes of a first plane 33, second plane 34, and third plane 35, and is filled with a medium whose refractive index is larger than 1.

Moreover, a display light from an image display device 36, which is incident upon the optical system via the third plane 35 as a transmission plane disposed opposite to the image display device 36, is reflected by the first plane 33 disposed between the second plane 34 and observer's pupils 38 on an observer visual axis 37. Next, the light is incident upon the second plane 34 of a reflective plane eccentrically disposed opposite to the observer's pupils 38 on the observer visual axis 37, and reflected. This reflected light is transmitted through the first plane 33 and emitted from the optical system to proceed along the observer visual axis 37, and is incident upon the observer's pupils 38 without forming any intermediate image to form a display image on an observer's retina.

It is to be noted that in the drawing, reference numeral 39 denotes axes of the first plane 33 and second plane 34 which form an anamorphic plane, and reference numeral 40 denotes a center of a plane shape.

Needless to say, in addition to the optical system shown in FIG. 6A, various optical systems disclosed in the above-described publications can be applied.

Moreover, the magnification optical section and second display section may separately be rotated/operated as shown in FIG. 6B. Furthermore, for example, with respect to the cellular phone main body 1c, an angle at which a magnification optical section 31a is popped up may be set to be larger than that at which the second display section 18 is popped up.

Furthermore, for the optical system shown in FIG. 6A, the constitution is integrally held so that an optical positional relation between the optical system and display section does not change, and this integral constitution may be rotated/operated.

Next, a fifth embodiment of the present invention will be described.

FIGS. 7A and 7B show the appearance of the cellular phone according to the fifth embodiment of the present invention, FIG. 7A is a perspective view showing that the attachable/detachable operation key 2 is detached from a cellular phone main body 1d and a magnification optical section 42 is contained, and FIG. 7B is a side view showing that the attachable/detachable operation key 2 is detached from the cellular phone main body 1d and the magnification optical section 42 are turned out.

In FIG. 7A, the first display section 16 which is the standard display monitor for the call is disposed in one surface of the cellular phone main body 1c on one plane of the cellular phone main body 1d. As shown by the arrow B, the magnification optical section 42 turned out in a shown arrow $A_4$ direction is contained in a part to which the detached attachable/detachable operation key 2 is to be attached on the cellular phone main body 1d.

As shown in FIG. 7B, the second display section 18 for the enlarged display monitor is disposed in the cellular phone main body 1d. While the magnification optical section 42 is contained in the cellular phone main body 1d, the second display section 18 is disposed in a position which is not seen from the outside. Moreover, the magnification optical section 41 is fixed in a position where the part extends opposite to and in parallel with the second display section 18, when the attachable/detachable operation key 2 is detached from the cellular phone main body 1d and the magnification optical section 42 is turned out.

It is to be noted that the magnification optical section 42 includes a lens which has a predetermined refractive index, and the second display section 18 is constituted of a display device such as an LCD.

Moreover, the input operation of the phone number before making the call is performed with the operation key while watching the first display section 16 as the standard display monitor in either the state in which the attachable/detachable operation key 2 is attached to the cellular phone main body 1d or the detached state.

On the other hand, to see the detailed information by the enlarged display, the attachable/detachable operation key 2 is detached from the cellular phone main body 1d. Then, the magnification optical section 42 is turned out in the shown arrow $A_4$ direction of FIG. 7A. In this state, the detailed information displayed in the second display section 18 is enlarged by the magnification optical section 42, and taken into user's eyes 3.

Therefore, by the second display section 18 and magnification optical section 42, the detailed information by the enlarged display is reflected in the position where the user can easily browse the information. Moreover, while watching the detailed information displayed in the second display section 18 via the magnification optical section 42, the key operation is performed by the detached attachable/detachable operation key 2.

It is to be noted that, needless to say, the constitutions of the magnification optical section 42 and second display section 18 are not limited to the structures shown in FIGS. 7A and 7B, and can be constituted using another optical system.

Next, a sixth embodiment of the present invention will be described.

FIGS. 8A and 8B show the appearance of the cellular phone according to the sixth embodiment of the present invention. FIG. 8A is a side view showing that the attachable/detachable operation key 2a is attached on the surface side of a cellular phone main body 1e, and FIG. 8B is a side view showing that the attachable/detachable operation key 2a is attached to the cellular phone main body 1e on the rear surface side.

As shown in FIG. 8A, the first display part 16 which is the standard display monitor for the call is disposed on the surface side as one surface of the cellular phone main body 1e on the same plane as that of the attachable/detachable operation key 2a in the state in which the attachable/ detachable operation key 2a is attached to the cellular phone main body 1e. The second display section 18 which is the enlarged display monitor is disposed in the cellular phone main body 1e, and is not seen from the outside in the state in which the attachable/detachable operation key 2a is attached to the cellular phone main body 1e.

Moreover, as shown in FIG. 8B, when the attachable/detachable operation key 2a is detached from the cellular phone main body 1e, the second display section 18 is exposed to the outside. In this case, the detached attachable/detachable operation key 2a is mounted on the rear surface side which is the other surface of the cellular phone main body 1e.

Figure 9A:
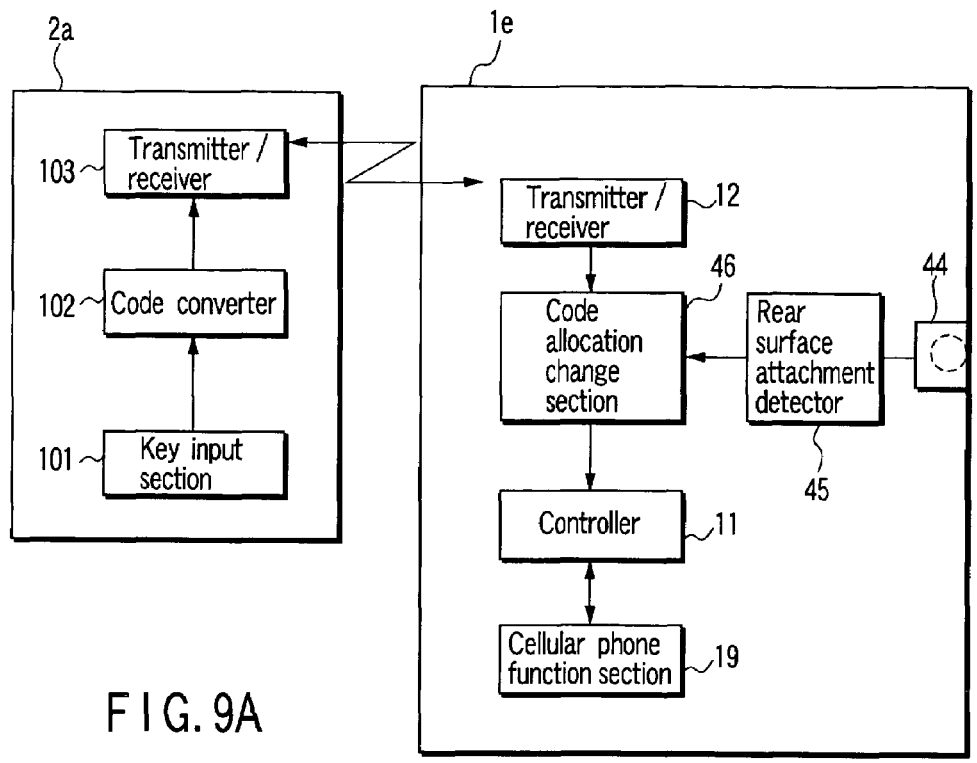
FIGS. 9A and 9B show a constitution of the sixth embodiment of the cellular phone according to the present invention.
Figure 9B:
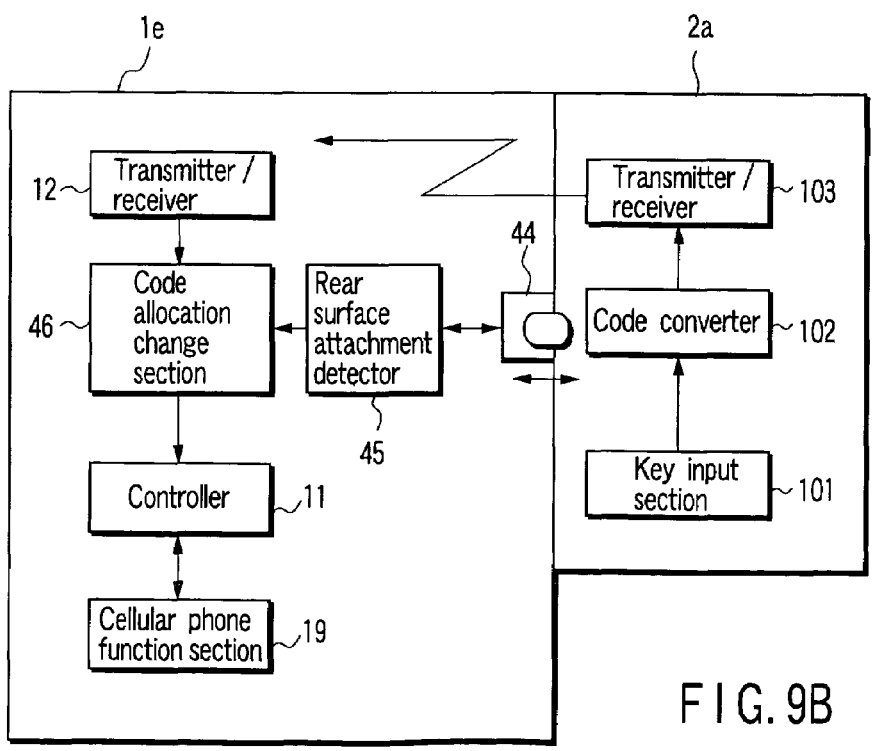

FIGS. 9A and 9B show the constitution of the sixth embodiment of the cellular phone according to the present invention, FIG. 9A is a block diagram showing a constitution in which an attachable/detachable operation key 2a is detached from the cellular phone main body 1e, and FIG. 9B is a block diagram showing the constitution in which the attadchable/detachable operation key 2a is attached to the cellular phone main body 1e on the rear surface side.

The cellular phone main body 1e is constituted of the controller 11, the transmitter/receiver 12, a cellular phone function section 19, a switch section 44, a rear surface attachment detector 45, and a code allocation change section 46. The attachable/detachable operation key 2a is constituted of the key input section 101, code converter 102, and transmitter/receiver 103.

The switch section 44 is a switch which turns on/off depending on whether or not the attachable/detachable operation key 2a is attached to the cellular phone main body 1e on the rear surface side. In accordance with an on/off state of the switch section 44, it is judged in the rear surface attachment detector 45 whether or not the attachable/detachable operation key 2a is attached to the cellular phone main body 1e on the rear surface side. Furthermore, the code allocation change section 46 changes a code allocation function of the horizontal cursor arrow direction key from the signal from the rear surface attachment detector 45.

Now, as shown in FIG. 9A, when the attachable/detachable operation key 2a is not attached to the cellular phone main body 1e on the rear surface side, that is, when the attachable/detachable operation key 2a is attached to the cellular phone main body 1e on the surface side or when the key is detached but is not attached on the rear surface side, the cellular phone main body 1e transmits/receives the signal with respect to the attachable/detachable operation key 2 a by a cable or by radio.

Moreover, as shown in FIG. 9B, when the attachable/detachable operation key 2a is attached to the cellular phone main body 1e on the rear surface side, the switch part 44 turns off. Accordingly, the rear surface attachment detector 45 detects that the attachable/detachable operation key 2a is attached to the cellular phone main body 1e on the rear surface side.

When the rear surface attachment detector 45 detects that the attachable/detachable operation key 2a is attached to the cellular phone main body 1e on the rear surface side, a change process of the code allocation functions of two horizontal cursor arrow direction keys (not shown) in the attachable/detachable operation key 2a is performed. That is, by the signal from the rear surface attachment detector, the code allocation change section 46 changes the code allocation function as shown in the following table 1.

TABLE 1

Process of code allocation change section

| Arrow key | Usual time Detection signal H | Rear surface attached time Detection signal L |
|---|---|---|
| ⇐ | Code 25h | Code 27h |
| ⇒ | Code 27h | Code 25h |

Here, in a moving direction of a cursor or pointer on the display, "code 25h=left", "code 27h=right" are represented. In a stage of mode setting, these may also be set so that function setting is impossible. Moreover, "H" of a detection signal indicates that the key is not attached to the rear surface, and "L" of the detection signal indicates that the key is attached to the rear surface.

With the use of the second display section 18 which is the enlarged display monitor, when the user looks into and operates the second display section 18 with one hand, the attachable/detachable operation key 2a may be attached to the cellular phone main body 1e on the rear surface side. However, in this case, the left and right of the display direction are reversed. Therefore, only in this case, when the left and right of the code allocation of the horizontal cursor arrow direction key are reversed, the main body can be operated in a usual process.

The code allocation change section 46 is disposed to perform this process, mechanically detects that the attachable/detachable operation key 2 is attached to the cellular phone main body 1e on the rear surface side, and changes the code allocations of the left and right horizontal cursor arrow direction keys, when the key is attached. For the code allocation change of these horizontal cursor arrow direction keys, the pattern of the operation key is switched in accordance with a user's choice.

Next, a seventh embodiment of the present invention will be described.

Figure 10A:
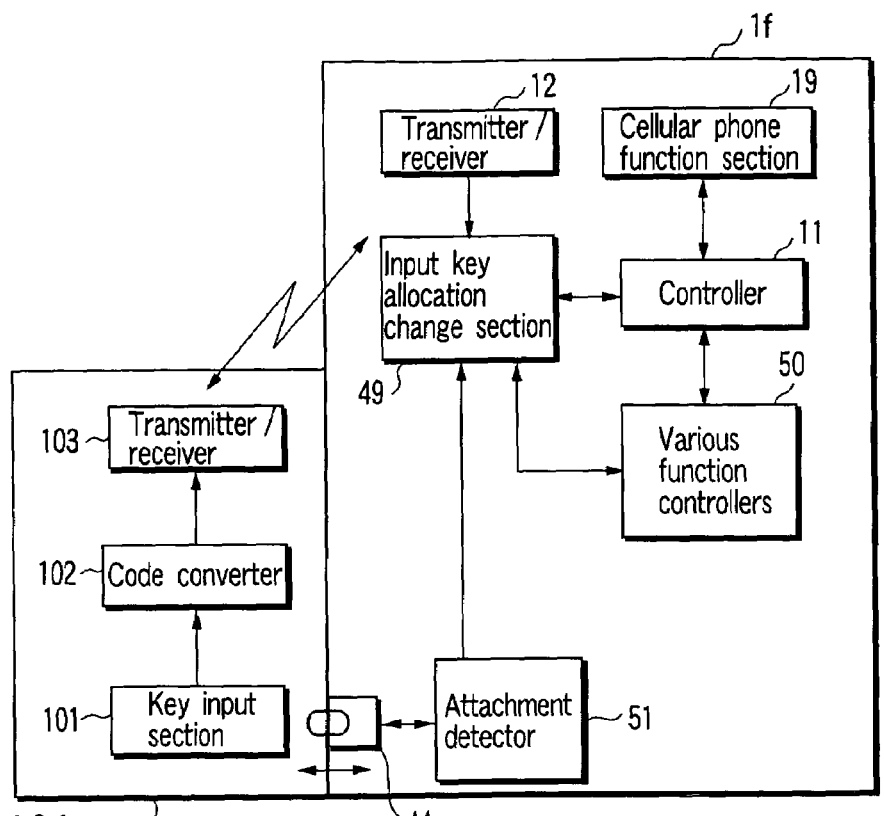
FIGS. 10A and 10B show a constitution of the seventh embodiment of the cellular phone according to the present invention.
Figure 10B:
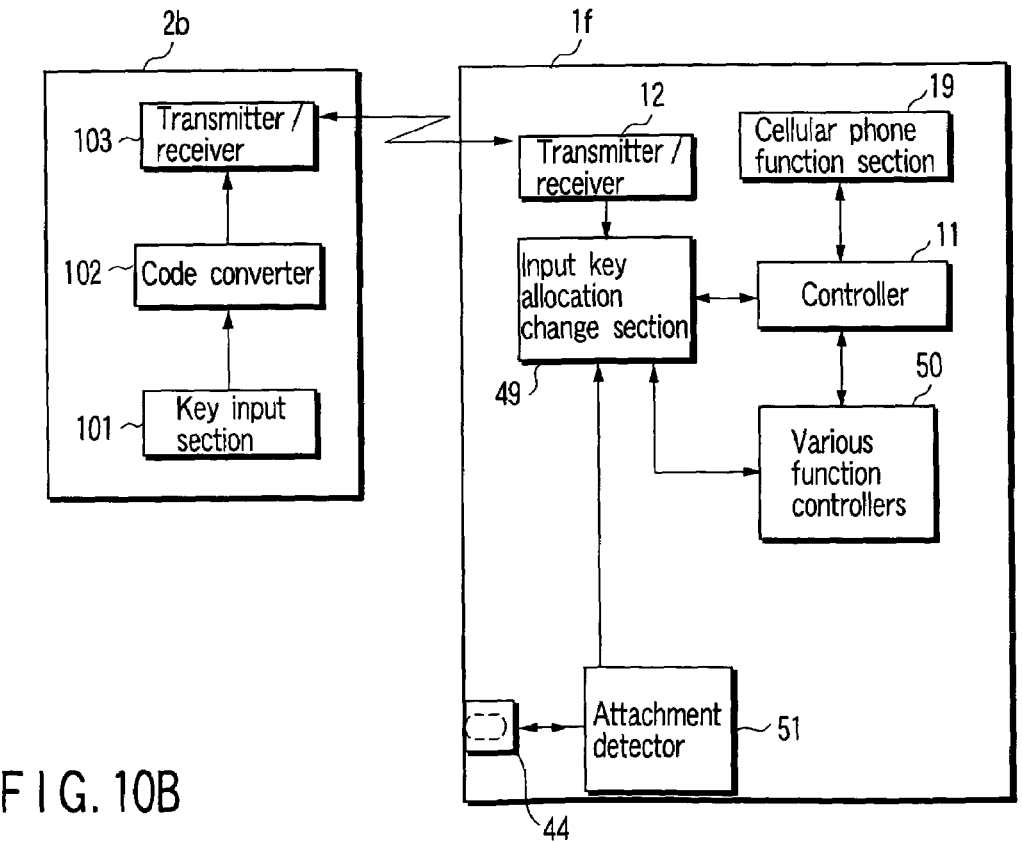

FIGS. 10A and 10B show the constitution of the seventh embodiment of the cellular phone according to the present invention, FIG. 10A is a block diagram showing the constitution in which an attachable/detachable operation key 2b is attached to a cellular phone main body 1f, and FIG. 10B is a block diagram showing the constitution in which the attachable/detachable operation key 2b is detached from the cellular phone main body 1f.

The cellular phone main body 1f is constituted of the controller 11, the transmitter/receiver 12, the cellular phone function section 19, the switch section 44, an input key allocation change section 49, various function controllers 50, and an attachment detector 51. The attachable/detachable operation key 2b is constituted of the key input section 101, code converter 102, and transmitter/receiver 103.

The switch section 44 is a switch which turns on/off depending on whether or not the attachable/detachable operation key 2a is attached to the cellular phone main body 1f. In accordance with the on/off state of the switch section 44, it is judged in the attachment detector 51 whether or not the attachable/detachable operation key 2b has been attached to the cellular phone main body 1f. Furthermore, the input key allocation change section 49 changes an information allocation function of the input key by the signal from the attachment detector 51.

Now, as shown in FIG. 10A, when the attachable/detachable operation key 2b is attached to the cellular phone main body 1f, the switch section 44 turns off, and the attachment detector 51 outputs a signal "L" indicating that the attachable/detachable operation key 2b is attached to the input key allocation change section 49. On receiving this, the input key allocation change section 49 judges that the input key is for usually inputting numerals or characters, and transmits character data corresponding to the input key to the controller 11. The controller 11 controls the character data.

On the other hand, as shown in FIG. 10B, when the attachable/detachable operation key 2b is detached from the cellular phone main body 1f, the switch section 44 turns on, and the attachment detector 51 outputs a signal "H" indicating that the attachable/detachable operation key 2b is detached to the input key allocation change section 49. Accordingly, the attachment detector instructs various function controllers 50 to change the key allocation so that the use of the input key is changed to that as the function key as an enlarged display viewer from that for inputting the text, and the corresponding function controller 50 controls this.

It is to be noted that the user is assumed to use the phone without watching the vicinity of the operation key. Therefore, it is assumed that the key functions as a function key so that one key is associated with one operation driving.

Here, the following are examples of various functions of the function key.

F1: ESC
F2: Select
F3: Down scroll
F4: Up scroll
F5: Left scroll
F6: Right scroll
F7: Open menu
F8: Close menu
F9: Open browser
Fa: Select bookmark
Fb: Close browser Moreover, menu examples by the function key F7 are as follows.

a: Select standard display/enlarged display
b: Select energy saving mode
c: Select call
d: Switch external speaker
e: Convert resolution
f: Open menu
g: User custom 1
h: User custom 2
i: User custom 3
j: Return Next, an eighth embodiment of the present invention will be described.

Figures 11A, 11B:
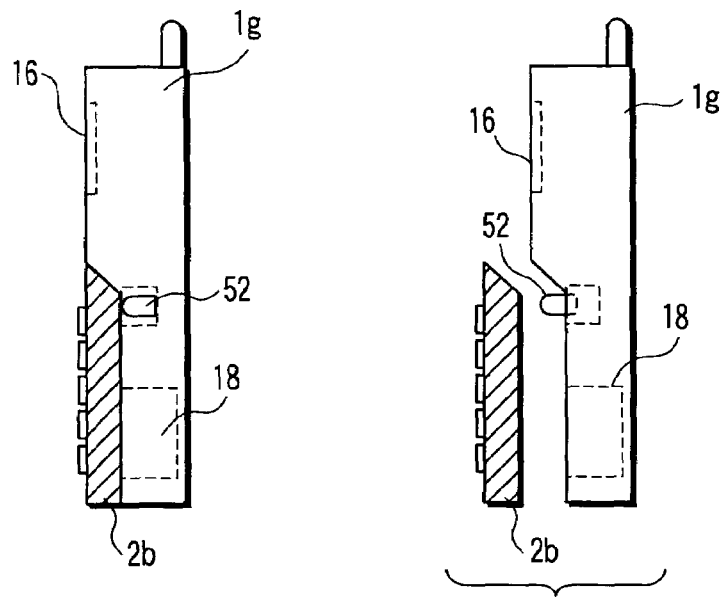
FIGS. 11A and 11B show the appearance of the cellular phone according to an eighth embodiment of the present invention.

FIGS. 11A and 11B show the appearance of the cellular phone according to the eighth embodiment of the present invention, FIG. 11A is a side view showing that the attachable/detachable operation key 2b is attached to a cellular phone main body 1g, and FIG. 11B is a side view showing that the attachable/detachable operation key 2b is detached from the cellular phone main body 1g.

As shown in FIG. 11A, in the state in which the attachable/detachable operation key 2b is attached to the cellular phone main body 1g, the first display section 16 which is the standard display monitor for the call is disposed in one surface of the cellular phone main body 1g on the same plane as that of the attachable/detachable operation key 2b. The second display section 18 which is the enlarged display monitor is disposed in the cellular phone main body 1g, and is not seen from the outside, while the attachable/detachable operation key 2b is attached to the cellular phone main body 1g.

Moreover, as shown in FIG. 11B, when the attachable/detachable operation key 2b is detached from the cellular phone main body 1g, the second display section 18 is exposed to the outside. In the same manner as the second display section 18, a display switch 52 exposed to the outside in the state in which the attachable/detachable operation key 2b is detached from the cellular phone main body 1g is disposed in the cellular phone main body 1g.

It is to be noted that the display switch 52 switches first and second power supplies in the cellular phone main body 1g not shown in FIGS. 11A and 11B.

Figure 12A:
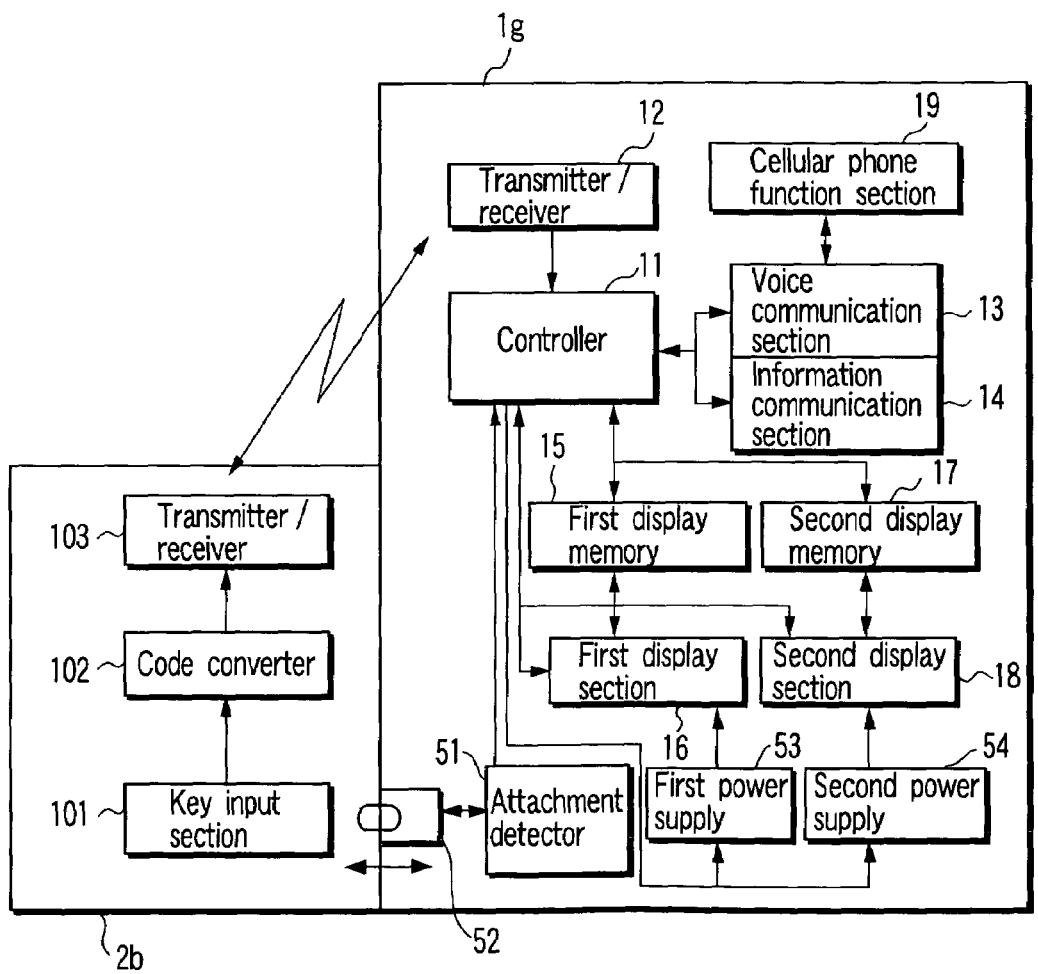
FIGS. 12A and 12B show the constitution of the eighth embodiment of the cellular phone according to the present invention.
Figure 12B:
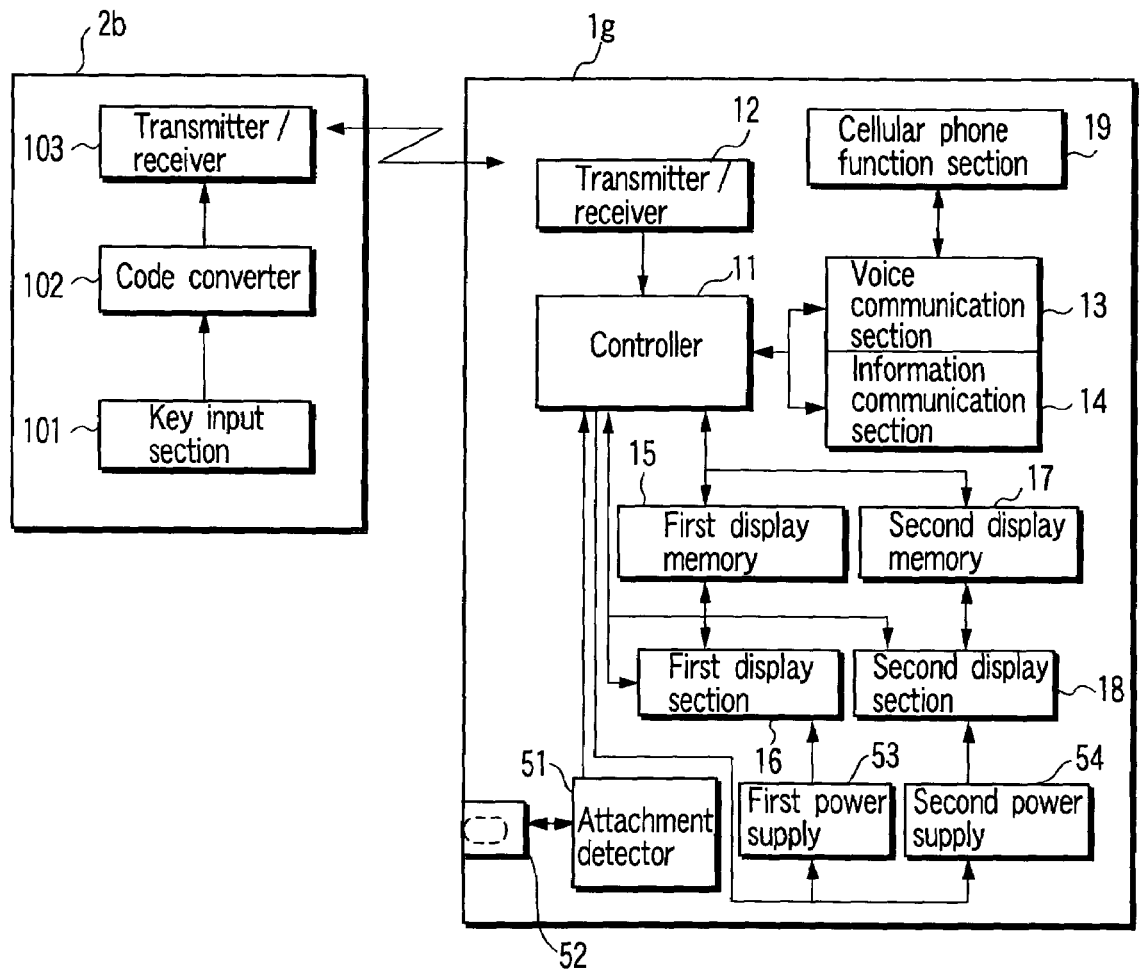

FIGS. 12A and 12B show the constitution of the eighth embodiment of the cellular phone according to the present invention, FIG. 12A is a block diagram showing the constitution in which the attachable/detachable operation key 2b is attached to the cellular phone main body 1g, and FIG. 12B is a block diagram showing the constitution in which the attachable/detachable operation key 2b is detached from the cellular phone main body 1g.

The cellular phone main body 1g is constituted of the controller 11, transmitter/receiver 12, voice communication section 13, information communication section 14, first display memory 15, first display section 16, second display memory 17, second display section 18, cellular phone function section 19, attachment detector 51, display switch 52, and first and second power supplies 53 and 54 which are power supplies mainly for the first display section 16 and second display section 18. The attachable/detachable operation key 2b is constituted of the key input section 101, code converter 102, and transmitter/receiver 103.

The display switch 52 is a switch which turns on/off depending on whether or not the attachable/detachable operation key 2b is attached to the cellular phone main body 1g. In accordance with the on/off state of the display switch 52, it is judged in the attachment detector 51 whether or not the attachable/detachable operation key 2b has been attached to the cellular phone main body 1g. Furthermore, the controller 11 controls so as to turn on/off the first power supply 53 for the first display section 16 and the second power supply 54 for the second display section 18 in response to the signal from the attachment detector 51, and also controls the voice communication section 13 and information communication section 14.

As shown in FIG. 12A, when the attachable/detachable operation key 2b is attached to the cellular phone main body 1g, the display switch 52 turns off. Accordingly, the attachment detector 51 supplies the signal "L" indicating that the attachable/detachable operation key 2b is attached to the controller 11.

On receiving this, the controller 11 turns on the first power supply 53 so as to use the first display section 16 which is the standard display section for the call. Additionally, the voice communication section 13 is also turned on to obtain a use state. At this time, the second power supply 54 for the second display section 18 which is the enlarged display monitor and the information communication section 14 are not used and are therefore turned off.

On the other hand, as shown in FIG. 12B, when the attachable/detachable operation key 2b is detached from the cellular phone main body 1g, the display switch 52 turns on, and the attachment detector 51 supplies the signal "H" indicating that the attachable/detachable operation key 2b is detached from the attachment detector 51 to the controller 11.

Next, the controller 11 turns on the second power supply 54 so as to use the second display section 18 which is the enlarged display section for information. Additionally, the communication section for information 14 is turned on so that the communication section is brought into the use state to start obtaining the information. At this time, the first power supply 53 for the first display section 16 and the voice communication section 13 are not used and are therefore turned off.

That is, when the cellular phone is used as the apparatus for the call, the attachable/detachable operation key 2b is in the attached state with respect to the cellular phone main body 1g, and the first power supply 53 for the first display section 16 which is a standard display and the voice communication section 13 are turned on. The second power supply 54 for the second display section 18 which is an enlarged display and the information communication section 14 are turned off.

On the other hand, when the cellular phone is used as an apparatus for the information, the attachable/detachable operation key 2b is in the detached state from the cellular phone main body 1g. The second power supply 54 for the second display section 18 which is the enlarged display and the information communication section 14 are turned on. The first power supply 53 for the first display section 16 which is the standard display and the voice communication section 13 are turned off.

When the enlarged display is used in this manner, the information data of the internet homepage is obtained, and the standard display section for the call is not used. Therefore, in the display switch 52 and attachment detector 51, an attaching/detaching event of the attachable/detachable operation key 2b is detected, and a signal indicating this is transmitted to the controller 11. Accordingly, the first power supply 53 is turned off and the first display section 16 is turned off. Additionally, the second power supply is turned on and the second display section 18 is turned off under the control of the controller 11. Furthermore, simultaneously with the turning-on/off of the first and second power supplies 53 and 54, the information communication section 14 is controlled to be operated to start obtaining the information.

It is to be noted that when the attachable/detachable operation key 2b is again attached to the cellular phone main body 1g, the above-described operation for the call is performed, and the alternate operation is performed in accordance with the output of the display switch 52.

Furthermore, in the eighth embodiment, the first power supply 53 for the first display section 16 operates opposite to the second power supply 54 for the second display section 18, but a simultaneously operating mode can also be provided. It is similarly possible to provide a mode in which the communication for the call and the communication for the information can arbitrarily be switched and used.

Next, a ninth embodiment of the present invention will be described.

Figure 13:
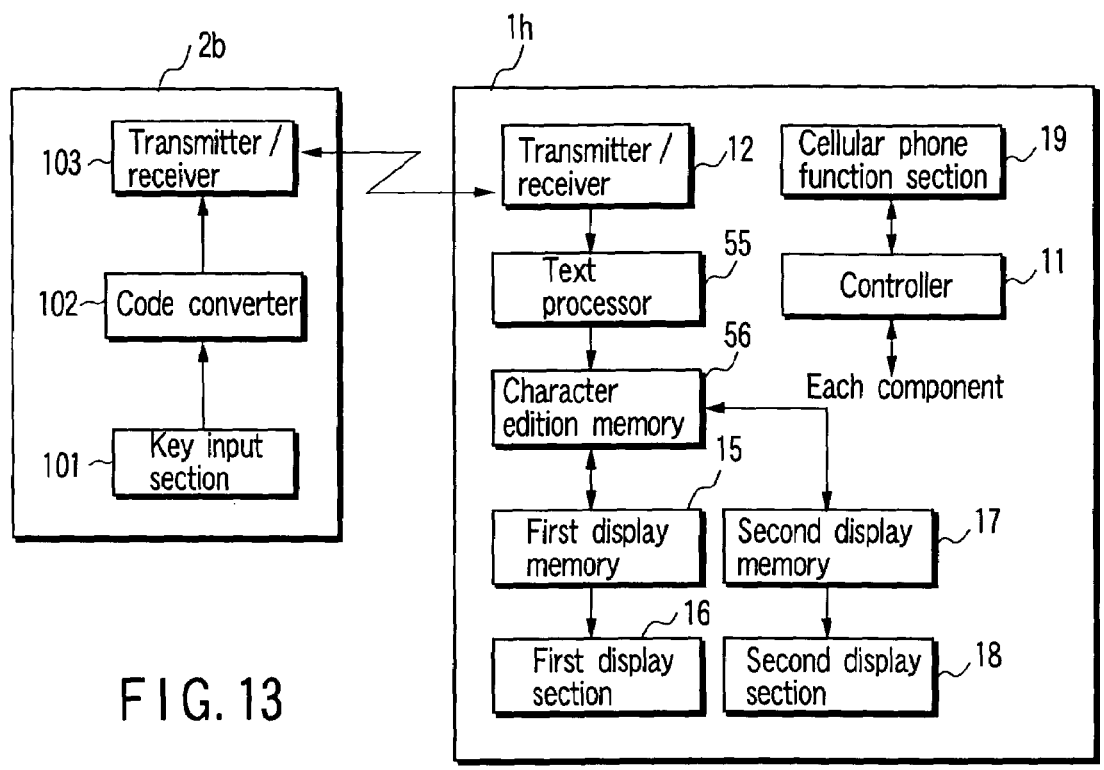
FIG. 13 shows the constitution of a ninth embodiment of the cellular phone according to the present invention, and is a block diagram showing the constitution in which the attachable/detachable operation key 2 is detached from a cellular phone main body 1*h*.

FIG. 13 shows the constitution of the ninth embodiment of the cellular phone according to the present invention, and is a block diagram showing the constitution in which the attachable/detachable operation key 2 is detached from a cellular phone main body 1h.

The cellular phone main body 1h is constituted of the controller 11, transmitter/receiver 12, first display memory 15, first display section 16, second display memory 17, second display section 18, and cellular phone function section 19, and a text processor 55 and character edition memory 56. The attachable/detachable operation key 2 is constituted of the key input section 101, code converter 102, and transmitter/receiver 103.

In the ninth embodiment, the characters of a section of a document inputted from the attachable/detachable operation key 2 are displayed in the first display section 16, and the whole sentence is displayed in the second display section 18.

In the above-described embodiment, the internet homepage is browsed by a browser process, and the like, but an example of electronic mail preparation will be described.

The character data inputted from the attachable/detachable operation key 2b is transferred to the transmitter/receiver 12 of the cellular phone main body 1h from the transmitter/receiver 103 via transmission/reception means by the cable or by radio. The text processor 55 processes the data as text data of one character from code data, and the data is written in the character edition memory 56.

For the document which is a set of characters laid in the character edition memory 56, only the number of characters of about one line in the vicinity of a laid edition cursor is read into the first display memory 15 as needed. Moreover, the characters read into the first display memory 15 are displayed in the first display section which is the standard display monitor.

Moreover, the whole sentence is taken into the second display memory 17, and synthesized with a browser display image prepared beforehand. Moreover, the whole content of the sentence is controlled so as to be seen in the second display section 18 which is the enlarged display monitor.

Next, a tenth embodiment of the present invention will be described.

Figure 14:
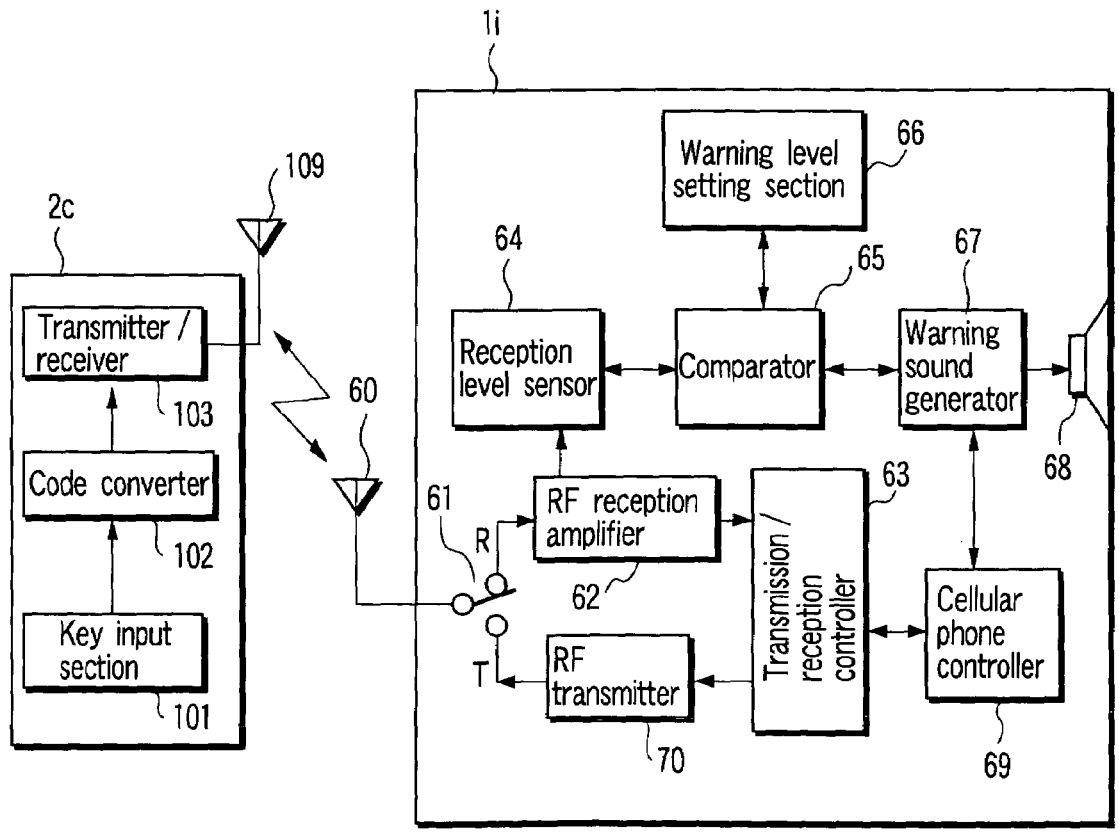
FIG. 14 shows the constitution of a tenth embodiment of the cellular phone according to the present invention, and is a block diagram showing the constitution in which an attachable/detachable operation key 2*c* is detached from a cellular phone main body 1*i*.

FIG. 14 shows the constitution of the tenth embodiment of the cellular phone according to the present invention, and is a block diagram showing the constitution in which an attachable/detachable operation key 2c is detached from a cellular phone main body 1i.

In the tenth embodiment, there is provided a function of generating a warning sound, when the attachable/detachable operation key 2c is distant from the cellular phone main body 1i to a certain degree. That is, in the cellular phone, an intensity of a radio wave from the attachable/detachable operation key 2c is detected by the cellular phone main body 1i, and a property is used that the radio wave intensity weakens, when the attachable/detachable operation key 2c is distant from the cellular phone main body 1i.

The cellular phone main body 1i is constituted of: an antenna 60; an RF switch 61; an RF reception amplifier 62; a transmission/reception controller 63; a reception level sensor 64 which is radio wave intensity detection means; a comparator 65 which is radio wave intensity comparison means; a warning level setting part 66 which is critical radio wave intensity indication means; a warning sound generator 67; a speaker 68; a cellular phone controller 69; and an RF transmitter 70. The attachable/detachable operation key 2c is constituted of the key input section 101, code converter 102, and transmitter/receiver 103, and an antenna 109.

It is to be noted that in the tenth embodiment shown in FIG. 14, a transmitter/receiver for transmission/reception between the attachable/detachable operation key 2c and cellular phone main body 1i will mainly be described.

In this constitution, the attachable/detachable operation key 2c emits an output at a value of a low level via the antenna 109 even at a time other than the key operation time. On the other hand, in the cellular phone main body 1i, the transmission and reception are controlled so as to be switched by the RF switch 61.

In the cellular phone main body 1i, an automatic gain control of the RF reception amplifier 62 is carried out in order to stabilize reception sensitivity at a reception time of the radio wave from the attachable/detachable operation key 2c. When the controlled signal is supplied to the reception level sensor 64, the signal is converted to a digital signal easy to compare, and subsequently transferred to the comparator.

In the comparator 65, as shown in the following table 2, the signal to be compared is compared with a predetermined set value of the warning level setting part 66. Moreover, as a result of comparison, in accordance with an electric field intensity, the signal is outputted to the warning sound generator 67 so as to turn on/off the warning sound.

TABLE 2

Notification by radio wave intensity

| Received field intensity | Comparator output | Warning sound |
|---|---|---|
| High | H | Sound OFF |
| Low | L | Sound ON |

In this manner, the control is executed in order to issue the warning sound via the speaker 68 based on the output of the comparator 65.

For example, assuming that the signal to be compared is A and the set value of the warning level setting part 66 is B, when both are compared with each other by the comparator 65, A<B is established. At this time, an output "L" is supplied to the warning sound generator 67. Accordingly, the warning sound is controlled to be issued via the speaker 68.

It is to be noted that in the above-described example, the warning sound is generated to notify the user, but this is not limited, and the user may also be notified by light emission or display.

Next, an eleventh embodiment of the present invention will be described with reference to FIGS. 15A to 15C and 16.

Figure 15A:
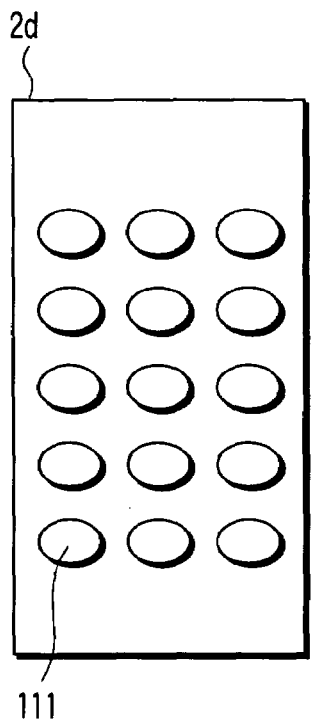
FIGS. 15A to 15C show the appearance configuration of the attachable/detachable operation key according to an eleventh embodiment of the present invention.
Figure 15B:
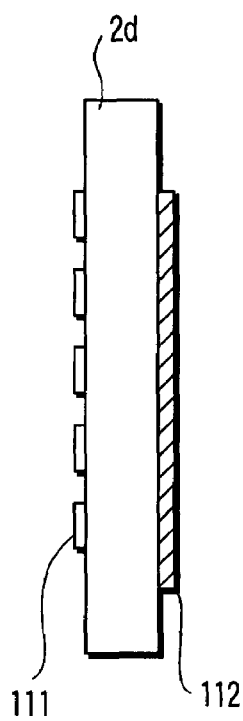
Figure 15C:
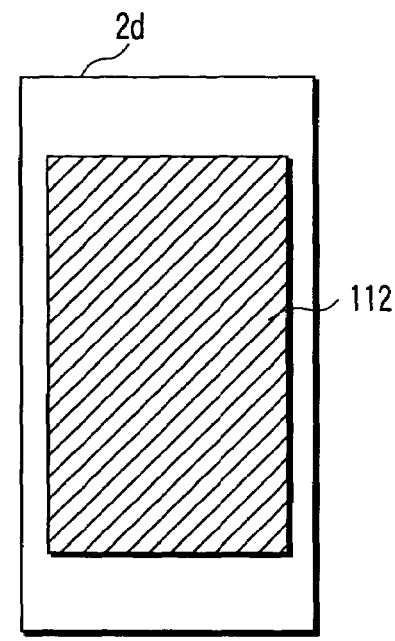
Figure 16:
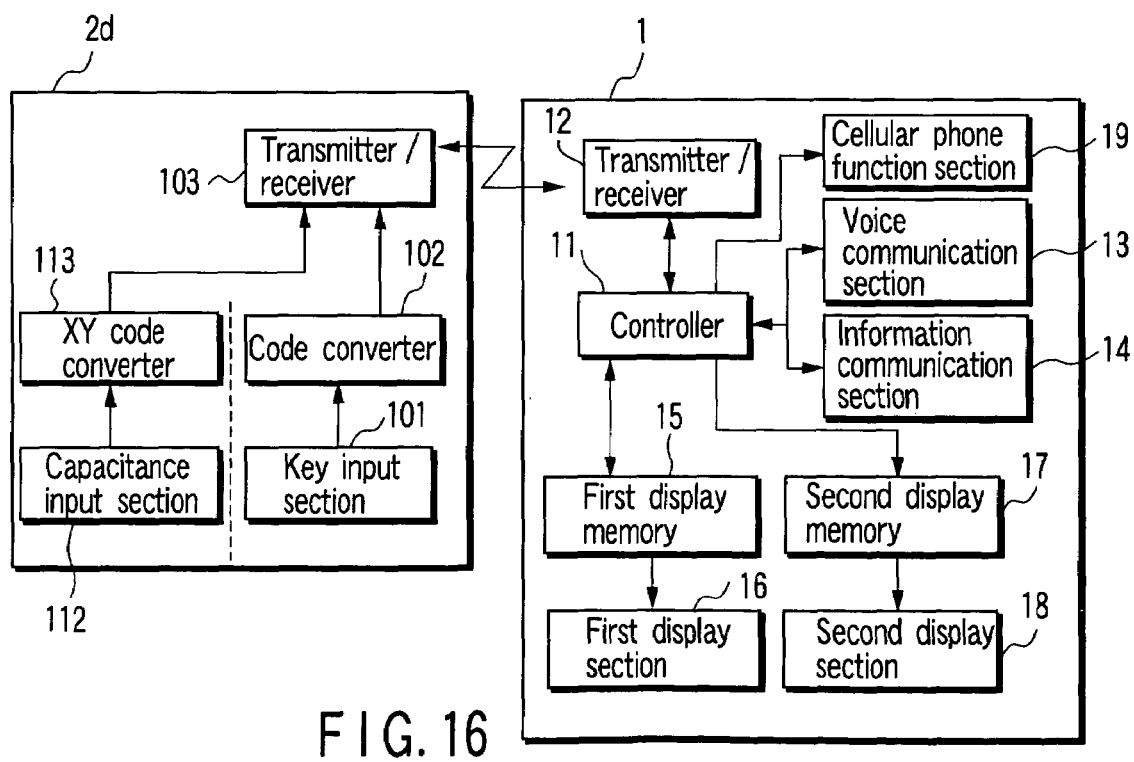
FIG. 16 is a block diagram showing the constitution of the cellular phone according to the eleventh embodiment of the present invention.

FIGS. 15A to 15C show the appearance configuration of the attachable/detachable operation key according to the eleventh embodiment of the present invention, FIG. 15A is a plan view showing the surface side, FIG. 15B is a side view, and FIG. 15C is a plan view showing the rear surface side. FIG. 16 is a block diagram showing the constitution of the cellular phone according to the eleventh embodiment.

A plurality of operation keys 111 are disposed on the surface side of an attachable/detachable operation key 2d. On the rear surface side of the second display means, as instruction operation means, a capacitance input section 112 which is an input keyboard using a capacitance is disposed. When the user touches the surface of the board with fingertips to move the board, the input is performed.

When a capacitance change is generated in an in-plane position of the capacitance input section 112, XY data is outputted to an XY code converter 113. In the XY code converter 113, the data is easily processed in the cellular phone main body 1, and converted into data for transmission/reception. Furthermore, the data is mixed in the transmitter/receiver 103 so that the key input can be carried out from the key input section 101, and the data is transmitted to the cellular phone main body 1 by cable or by radio.

In the cellular phone main body 1, a movement process of a pointer is carried out in the same manner as in a conventional mouse. As a result, in the second display memory 17 and second display section 18, the input by the capacitance input section 112 is controlled so as to be displayed as the pointer.

Next, a modification example of the eleventh embodiment will be described.

FIGS. 17A to 17C show the appearance configuration of the attachable/detachable operation key according to the modification example of the eleventh embodiment of the present invention, FIG. 17A is a plan view showing the surface side, FIG. 17B is a side view, and FIG. 17C is a plan view showing the rear surface side. FIG. 18 is a block diagram showing the constitution of the cellular phone according to the modification example of the eleventh embodiment.

A cross key section 115 which is an input section formed in a cross shape is disposed as the instruction operation means on the rear surface side of an attachable/detachable operation key 2e on the surface side of which the plurality of operation keys 111 are disposed. This cross key section 115 is operated for the input only in a direction of a part of the cross shape pressed with the user's fingertip.

The signal inputted with the cross key section 115 is outputted to an XY code converter 116 and converted into code data which is a process like an arrow key for the key operation. In the XY code converter 116, the data is easily processed in the cellular phone main body 1, and converted into the data for transmission/reception. Furthermore, the data is mixed in the transmitter/receiver 103 so that the key input can be carried out from the key input section 101, and the data is transmitted to the cellular phone main body 1 by cable or by radio.

In the cellular phone main body 1, the pointer movement process is carried out in the same manner as described above.

Next, a twelfth embodiment of the present invention will be described with reference to FIGS. 19 to 21.

Figure 19:
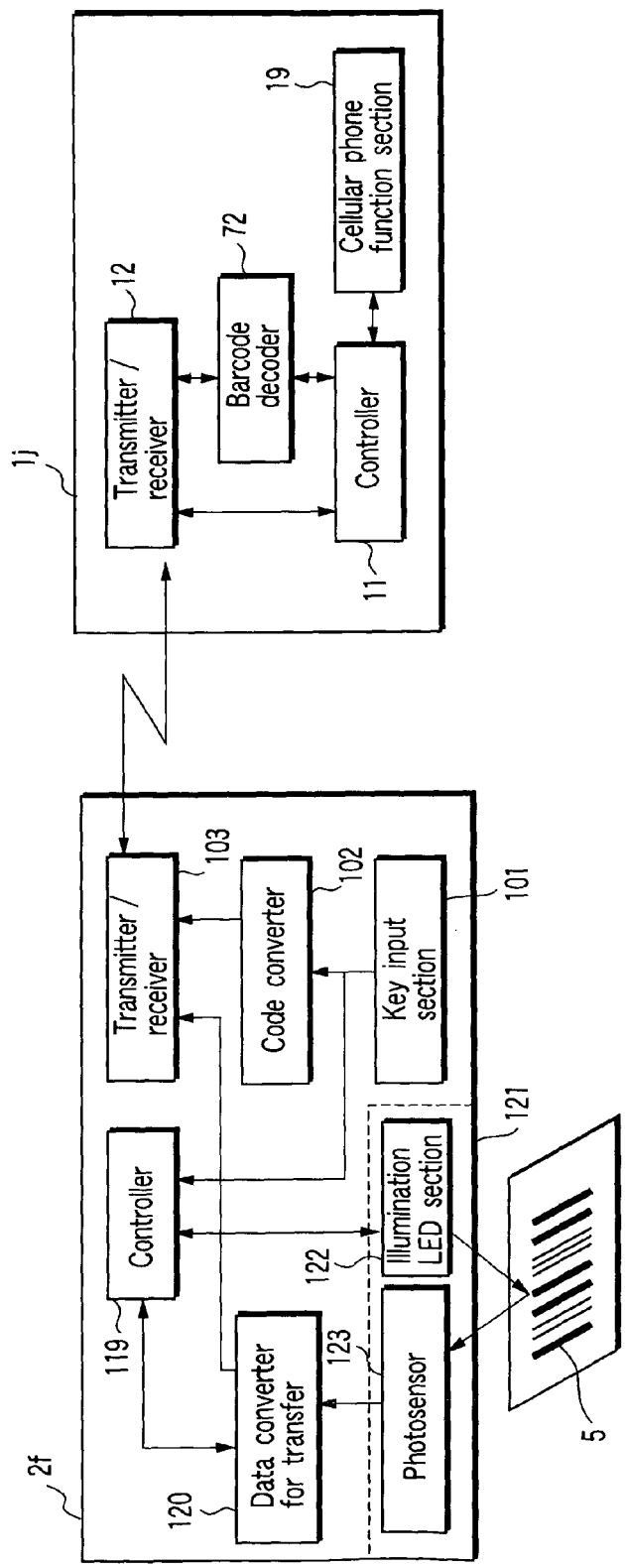
FIG. 19 is a block diagram showing the constitution of the cellular phone according to a twelfth embodiment of the present invention.

FIG. 19 is a block diagram showing the constitution of the cellular phone according to the twelfth embodiment of the present invention. FIGS. 20A and 20B show the appearance configuration of the attachable/detachable operation key according to the twelfth embodiment, FIG. 20A is a plan view showing the surface side, and FIG. 20B is a side view. Furthermore, FIG. 21 is a diagram showing an example in which an attachable/detachable operation key 2f according to the twelfth embodiment is used as a barcode reader.

A cellular phone main body 1j is constituted of the controller 11, transmitter/receiver 12, and cellular phone function section 19, and a barcode decoder 72. The attachable/detachable operation key 2f is constituted of the key input section 101, code converter 102, and transmitter/receiver 103, and a controller 119, data converter for transfer 120, and barcode reader 121. It is to be noted that this barcode reader 121 is constituted of an illumination LED (light emitting diode) section 122 for illuminating a barcode 5, and a photosensor 123 for detecting the illuminated barcode 5.

On the operation surface side of the attachable/detachable operation key 2f, a plurality of operation keys including a switch for read 101a for reading the barcode 5 are disposed. Moreover, for example, in a part of a lower end of the attachable/detachable operation key 2f, the barcode reader 122 including the illumination LED section 121 and photosensor 123 is incorporated.

In this constitution, while the switch for read 101a is turned on by a user's hand 6, the barcode reader 121 is allowed to abut onto the barcode 5, and further the attachable/detachable operation key 2f is moved in an arrow direction shown in FIG. 21. At this time, the switch for read 101a is turned on, and a controller 119 signal is transmitted from the key input section 101. Accordingly, the controller 119 outputs a lighting signal to the illumination LED section 122 so that the barcode 5 is read by the attachable/detachable operation key 2f.

The present embodiment has been explained using an example of the barcode. However, a two-dimensional code such as a matrix code and a stacked barcode can be used.

When the lighting is started by the illumination LED section 122, the surface of the barcode 5 is irradiated with the light, and the reflected light is received by the photosensor 123. In this photosensor 123, the received light is converted to a digital signal. Moreover, in the data converter for transfer 120, the converted digital signal is synchronized, converted as primary data of a barcode pattern, and converted into a signal for communication in order to transfer the data to the cellular phone main body 1j. Moreover, the data is transmitted to the cellular phone main body 1j via the transmitter/receiver 103 by cable or by radio.

In the cellular phone main body 1j, the barcode pattern signal taken via the transmitter/receiver 12 is converted to the code data corresponding to the barcode in the barcode decoder 72. Subsequently, the code data is supplied to the controller 11, and subsequently the process for the barcode is carried out.

It is to be noted that in the twelfth embodiment, the barcode decoder is disposed on the cellular phone main body side, but the present invention is not limited to this, and the barcode decoder may also be disposed on the attachable/detachable operation key side.

Moreover, in the twelfth embodiment, an example in which the attachable/detachable operation key includes the barcode reader and has a function of reading the barcode has been described, but the operation key may have a camera function. In this case, instead of the barcode reader 121, means which includes a lens and image pickup device and which has the camera function may also be disposed.

Next, a thirteenth embodiment of the present invention will be described with reference to FIGS. 22 to 24.

Figure 22:
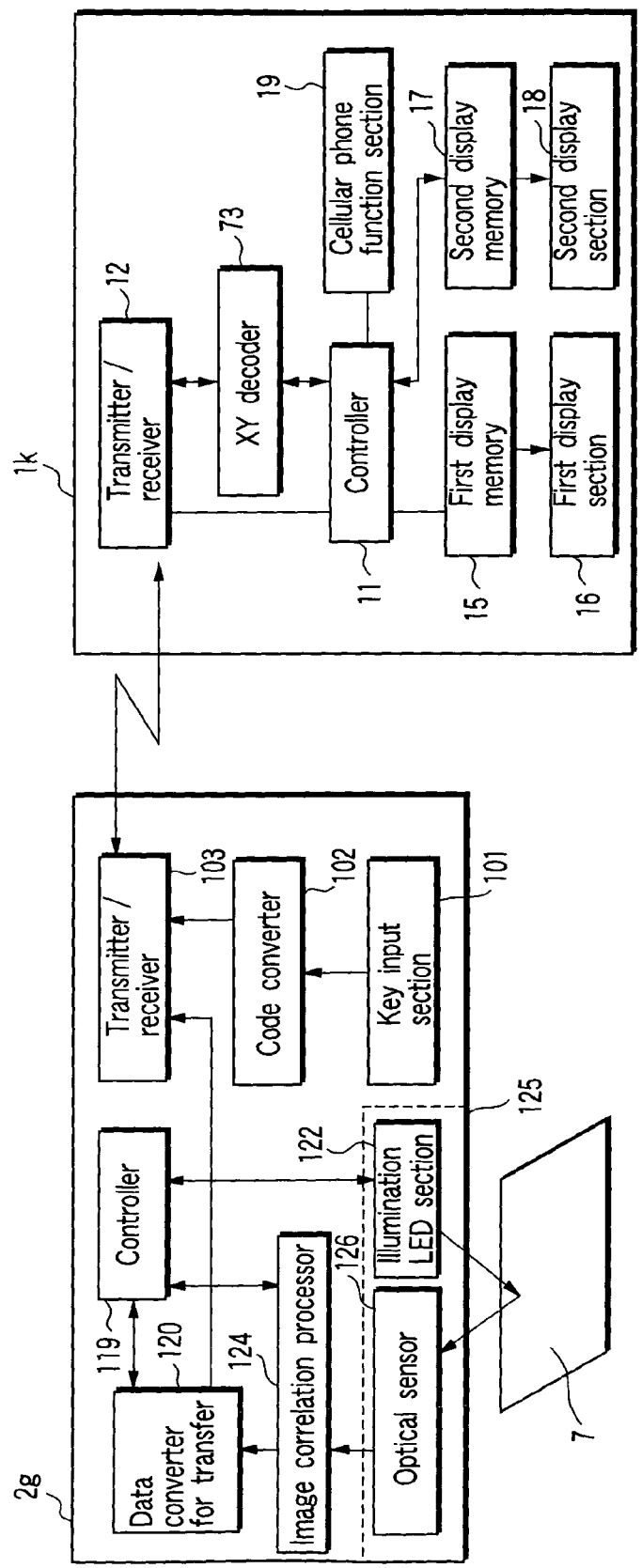
FIG. 22 is a block diagram showing the constitution of the cellular phone according to a thirteenth embodiment of the present invention.

FIG. 22 is a block diagram showing the constitution of the cellular phone according to the thirteenth embodiment of the present invention. FIGS. 23A and 23B show the appearance configuration of the attachable/detachable operation key according to the thirteenth embodiment, FIG. 23A is a plan view showing the surface side, and FIG. 23B is a side view. Furthermore, FIG. 24 is a diagram showing an example in which an attachable/detachable operation key 2g according to the thirteenth embodiment is used as an optical pointing device (mouse).

A cellular phone main body 1k is constituted of the controller 11, transmitter/receiver 12, first display memory 15, first display section 16, second display memory 17, second display section 18, and cellular phone function section 19, and an XY decoder 73.

Moreover, the attachable/detachable operation key 2g is constituted of the key input section 101, code converter 102, transmitter/receiver 103, controller 119, and data converter for transfer 120, and an image correlation processor 124, and optical mouse section 125. It is to be noted that the optical mouse section 125 includes the illumination LED (light emitting diode) section 122 for illuminating an object 7, and an optical sensor 126 for sensing the illuminated object 7. Furthermore, the optical mouse section 125 is disposed in a part of the attachable/detachable operation key 2f on the rear surface side.

In this constitution, the user grasps the attachable/detachable operation key 2g with the hand 6, disposes the optical mouse section 125 onto the object 7, and moves the part in a predetermined direction. Then, the controller 119 outputs a signal requesting for lighting to the illumination LED section 122.

Accordingly, the illumination LED section 122 is lit, the light hits the surface of the object 7, and the reflected light is received by the optical sensor 126 which is a two-dimensional optical sensor. The light received by the optical sensor 126 is sent to the image correlation processor 124, and here two-dimensional movement information is obtained. Furthermore, in the data converter for transfer 120, the light is converted to the signal for communication in order to transfer the data to the cellular phone main body 1k. Moreover, the data is transmitted to the cellular phone main body 1k via the transmitter/receiver 103 by cable or radio.

In the cellular phone main body 1k, the signal taken via the transmitter/receiver 12 is converted to movement distance data in the XY decoder 73. Moreover, the converted data is supplied to the controller 11, and the corresponding process is carried out as the mouse on the second display section 18.

It is to be noted that the operation key 111 which is a part of the key input section 101 may also be set so as to be allocated as a switch for a click operation of the mouse (so-called left button of the mouse).

Furthermore, even when a ball type mouse section is disposed in the attachable/detachable operation key 2g instead of the optical mouse section 125, the similar function/effect can be produced.

According to the present invention, there is obtained a cellular phone in which an operation key for performing an input operation is easily seen, operation instruction is possible, and a style at a usage time is not largely changed and which is not enlarged and with respect to which the operation key can be attached/detached.

What is claimed is:

1. A cellular phone comprising:
   voice communication means for transmitting and receiving data concerning voice communication and carrying out voice communication;
   information communication means for transmitting and receiving data concerning information communication, which includes an image, and carrying out information communication, which is different from voice communication;
   first display means disposed in a phone main body, for displaying the data concerning voice communication;
   second display means for displaying details of the data concerning information communication;
   operation means, removably attached to the phone main body, for inputting instructions including characters; and
   transmission/reception means for transmitting/receiving information between the operation means and the phone main body;
   wherein the second display means comprises a display section surface rotatably disposed in an attaching section in the phone main body; and
   wherein the cellular phone further comprises structure means for containing the second display means in the phone main body, when the operation means is attached to the phone main body, and for rotating the display section surface to set the second display means in a position in which the display is possible, when the operation means is detached from the phone main body.

2. A cellular phone comprising:
voice communication means for transmitting and receiving data concerning voice communication and carrying out voice communication;
information communication means for transmitting and receiving data concerning information communication, which includes an image, and carrying out information communication, which is different from voice communication;
first display means disposed in a phone main body, for displaying the data concerning voice communication;
second display means for displaying details of the data concerning information communication;
operation means, removably attached to the phone main body, for inputting instructions including characters; and
transmission/reception means for transmitting/receiving information between the operation means and the phone main body;
wherein the second display means comprises:
a projection display section disposed in the phone main body; and
a magnification reflective mirror section which is rotatably disposed in an attaching section in the phone main body so as to be rotatable to a position opposite to the projection display section; and
wherein the cellular phone further comprises structure means for folding and containing the magnification reflective mirror section in the phone main body, when the operation means is attached to the phone main body, and for positioning the magnification reflective mirror section in the position opposite to the projection display section, when the operation means is detached from the phone main body.

3. A cellular phone comprising:
voice communication means for transmitting and receiving data concerning voice communication and carrying out voice communication;
information communication means for transmitting and receiving data concerning information communication, which includes an image, and carrying out information communication, which is different from voice communication;
first display means disposed in a phone main body, for displaying the data concerning voice communication;
second display means for displaying details of the data concerning information communication;
operation means, removably attached to the phone main body, for inputting instructions including characters; and
transmission/reception means for transmitting/receiving information between the operation means and the phone main body;
wherein the second display means comprises:
a display section; and
a direct view type magnification optical section disposed opposite to the display section; and
wherein the cellular phone further comprises structure means for folding and containing the display section and magnification optical section in the phone main body, when the operation means is attached to the phone main body, and for setting a display surface of the display section and a surface of the magnification optical section in positions such that the surfaces are at a predetermined angle with respect to a surface of the phone main body and such that display is possible, when the operation means is detached from the phone main body.

4. A cellular phone comprising:
voice communication means for transmitting and receiving data concerning voice communication and carrying out voice communication;
information communication means for transmitting and receiving data concerning information communication, which includes an image, and carrying out information communication, which is different from voice communication;
first display means disposed in a phone main body, for displaying the data concerning voice communication;
second display means for displaying details of the data concerning information communication;
operation means, removably attached to the phone main body, for inputting instructions including characters; and
transmission/reception means for transmitting/receiving information between the operation means and the phone main body;
wherein the second display means comprises:
a display section; and
a direct view type magnification optical section disposed opposite to the display section; and
wherein the cellular phone further comprises structure means for containing the magnification optical section in the phone main body, when the operation means is attached to the phone main body, and for setting the magnification optical section in a display state position distant from a display surface of the display section by a predetermined interval, when the operation means is detached from the phone main body.

5. A cellular phone comprising:
voice communication means for transmitting and receiving data concerning voice communication and carrying out voice communication;
information communication means for transmitting and receiving data concerning information communication, which includes an image, and carrying out information communication, which is different from voice communication;
first display means disposed in a phone main body, for displaying the data concerning voice communication;
second display means for displaying details of the data concerning information communication;
operation means, removably attached to the phone main body, for inputting instructions including characters; and
transmission/reception means for transmitting/receiving information between the operation means and the phone main body;
wherein the phone main body includes a first attaching position at which the operation means is attached onto a surface side of the phone main body, and a second attaching position at which the operation means is attached onto a rear surface side of the phone main body after being detached from the phone main body.

6. The cellular phone according to claim 5, wherein the operation means includes two horizontal cursor arrow direction keys; and
wherein the cellular phone further comprises:
means for detecting that the operation means has been attached to the second attaching position;

change processing means for processing a change of a code allocation function of the two horizontal cursor arrow direction keys of the operation means; and code allocation change means for changing the code allocation function based on a signal of the detection means, when the operation means is attached to the second attaching position.

7. A cellular phone comprising:

voice communication means for transmitting and receiving data concerning voice communication and carrying out voice communication;

information communication means for transmitting and receiving data concerning information communication, which includes an image, and carrying out information communication, which is different from voice communication;

first display means disposed in a phone main body, for displaying the data concerning voice communication;

second display means for displaying details of the data concerning information communication;

operation means, removably attached to the phone main body, for inputting instructions including characters;

transmission/reception means for transmitting/receiving information between the operation means and the phone main body;

attaching/detaching detection means for detecting whether the operation means is attached to the phone main body; and switch means for switching display driving of the first and second display means based on a signal from the attaching/detaching detection means.

8. A cellular phone comprising:

voice communication means for transmitting and receiving data concerning voice communication and carrying out voice communication;

information communication means for transmitting and receiving data concerning information communication, which includes an image, and carrying out information communication, which is different from voice communication;

first display means disposed in a phone main body, for displaying the data concerning voice communication;

second display means for displaying details of the data concerning information communication;

operation means, removably attached to the phone main body, for inputting instructions including characters;

transmission/reception means for transmitting/receiving information between the operation means and the phone main body;

text conversion means for transferring character data key-inputted in the operation means to the phone main body from the operation means and for subsequently converting the data to text; and sentence edition recording means for storing a part of inputted data in a temporary memory at a sentence input time and for storing all inputted sentences in an all sentence memory, wherein the first display means displays the data of the temporary memory, and the second display means simultaneously displays the data of the all sentence memory.

9. A cellular phone comprising:

voice communication means for transmitting and receiving data concerning voice communication and carrying out voice communication;

information communication means for transmitting and receiving data concerning information communication, which includes an image, and carrying out information communication, which is different from voice communication;

first display means disposed in a phone main body, for displaying the data concerning voice communication;

second display means for displaying details of the data concerning information communication;

operation means, removably attached to the phone main body, for inputting instructions including characters; and transmission/reception means for transmitting/receiving information between the operation means and the phone main body;

wherein the operation means comprises:

capacitance use input means for performing an instruction operation for the second display means on a rear surface side of the operation means with respect to an operation surface of the operation means; and conversion means for converting the a signal from the capacitance use input means into a signal to be transferred; and wherein the phone main body receives the signal to be transferred converted by the conversion means via the transmission/reception means and comprises instruction operation processing means for performing an instruction operation process of the second display means based on the received signal.

10. A cellular phone comprising:

voice communication means for transmitting and receiving data concerning voice communication and carrying out voice communication;

information communication means for transmitting and receiving data concerning information communication, which includes an image, and carrying out information communication, which is different from voice communication;

first display means disposed in a phone main body, for displaying the data concerning voice communication;

second display means for displaying details of the data concerning information communication;

operation means, removably attached to the phone main body, for inputting instructions including characters; and transmission/reception means for transmitting/receiving information between the operation means and the phone main body;

wherein the operation means comprises:

cross operation key means for performing an instruction operation of the second display means on a rear surface side of the operation means with respect to an operation surface of the operation means; and conversion means for converting a signal outputted from the cross operation key means into a signal to be transferred; and wherein the phone main body receives the signal to be transferred converted by the conversion means via the transmission/reception means and comprises instruction operation processing means for performing an instruction operation process of the second display means based on the received signal.

11. A cellular phone comprising:

a voice communication section which carries out voice communication and communication of call information;

an information communication section which carries out communication of information other than the call information, including an image to be displayed;

a first display section which is disposed in a phone main body to display the call information;
a second display section which displays details of the information including the image to be displayed;
an operation key unit which is attachable/detachable with respect to the phone main body and which inputs at least one of character information and instruction information; and
a transmission/reception section which transmits/receives the at least one of character information and instruction information between the operation key unit and the phone main body;
wherein the second display section comprises a display section surface rotatably disposed in an attaching section in the phone main body; and
wherein the second display section is contained in the phone main body, when the operation key unit is attached to the phone main body, and the display section surface is rotated to set the second display section in a position in which the display is possible, when the operation key unit is detached from the phone main body.

12. A cellular phone comprising:
a voice communication section which carries out voice communication and communication of call information;
an information communication section which carries out communication of information other than the call information, including an image to be displayed;
a first display section which is disposed in a phone main body to display the call information;
a second display section which displays details of the information including the image to be displayed;
an operation key unit which is attachable/detachable with respect to the phone main body and which inputs at least one of character information and instruction information; and
a transmission/reception section which transmits/receives the at least one of character information and instruction information between the operation key unit and the phone main body;
wherein the second display section comprises:
  a projection display section disposed in the phone main body; and
  a magnification reflective mirror section which is rotatably disposed in an attaching section in the phone main body so as to be rotatable to a position opposite to the projection display section; and
wherein the magnification reflective mirror section is folded and contained in the phone main body, when the operation key unit is attached to the phone main body, and the magnification reflective mirror section is positioned in the position opposite to the projection display section, when the operation key unit is detached from the phone main body.

13. A cellular phone comprising:
a voice communication section which carries out voice communication and communication of call information;
an information communication section which carries out communication of information other than the call information, including an image to be displayed;
a first display section which is disposed in a phone main body to display the call information;
a second display section which displays details of the information including the image to be displayed;
an operation key unit which is attachable/detachable with respect to the phone main body and which inputs at least one of character information and instruction information; and
a transmission/reception section which transmits/receives the at least one of character information and instruction information between the operation key unit and the phone main body;
wherein the second display section comprises:
  a display section; and
  a direct view type magnification optical section disposed opposite to the display section; and
wherein the display section and magnification optical section are folded and contained in the phone main body, when the operation key unit is attached to the phone main body, and a display surface of the display section and a surface of the magnification optical section are set in positions such that the surfaces are at a predetermined angle with respect to a surface of the phone main body and such that display is possible, when the operation key unit is detached from the phone main body.

14. A cellular phone comprising:
a voice communication section which carries out voice communication and communication of call information;
an information communication section which carries out communication of information other than the call information, including an image to be displayed;
a first display section which is disposed in a phone main body to display the call information;
a second display section which displays details of the information including the image to be displayed;
an operation key unit which is attachable/detachable with respect to the phone main body and which inputs at least one of character information and instruction information; and
a transmission/reception section which transmits/receives the at least one of character information and instruction information between the operation key unit and the phone main body;
wherein the second display section comprises:
  a display section; and
  a direct view type magnification optical section disposed opposite to the display section; and
wherein the magnification optical section is contained in the phone main body, when the operation key unit is attached to the phone main body, and the magnification optical section is set in a display state position distant from a display surface of the display section by a predetermined interval, when the operation key unit is detached from the phone main body.

15. A cellular phone comprising:
a voice communication section which carries out voice communication and communication of call information;
an information communication section which carries out communication of information other than the call information, including an image to be displayed;
a first display section which is disposed in a phone main body to display the call information;
a second display section which displays details of the information including the image to be displayed;
an operation key unit which is attachable/detachable with respect to the phone main body and which inputs at least one of character information and instruction information; and a transmission/reception section which transmits/receives the at least one of character information and instruction information between the operation key unit and the phone main body;

wherein the phone main body includes a first attaching position in which the operation key unit is attached onto a surface side of the phone main body, and a second attaching position in which the operation key unit is attached onto a rear surface side of the phone main body after being detached from the phone main body.

16. The cellular phone according to claim 15, wherein the operation key unit includes two horizontal cursor arrow direction keys; and wherein the cellular phone further comprises:
   a rear surface attachment detection section which detects that the operation key unit has been attached to the second attaching position;
   a code change section of a code allocation function of the two horizontal cursor arrow direction keys of the operation key unit; and
   a code allocation change section which changes the code allocation function based on a signal from the rear surface attachment detection section, when the operation key unit is attached to the second attaching position.

17. A cellular phone comprising:

a voice communication section which carries out voice communication and communication of call information;

an information communication section which carries out communication of information other than the call information, including an image to be displayed;

a first display section which is disposed in a phone main body to display the call information;

a second display section which displays details of the information including the image to be displayed;

an operation key unit which is attachable/detachable with respect to the phone main body and which inputs at least one of character information and instruction information;

a transmission/reception section which transmits/receives the at least one of character information and instruction information between the operation key unit and the phone main body;

an attachment detection section which detects whether the operation key unit is attached to the phone main body; and a control section which switches display driving of the first and second display sections based on a signal of from the attachment detection section.

18. A cellular phone comprising:

a voice communication section which carries out voice communication and communication of call information;

an information communication section which carries out communication of information other than the call information, including an image to be displayed;

a first display section which is disposed in a phone main body to display the call information;

a second display section which displays details of the information including the image to be displayed;

an operation key unit which is attachable/detachable with respect to the phone main body and which inputs at least one of character information and instruction information;

a transmission/reception section which transmits/receives the at least one of character information and instruction information between the operation key unit and the phone main body;

a text processing section which transfers character data key-inputted in the operation key unit to the phone main body from the operation key unit and which subsequently converts the data to text; and a sentence edition memory including both a temporary memory in which only a part of inputted data is recorded at a sentence input time and an all sentence memory in which all inputted sentences are recorded;

wherein the first display section displays the data of the temporary memory, and the second display section simultaneously displays the data of the all sentence memory.

19. A cellular phone comprising:

a voice communication section which carries out voice communication and communication of call information;

an information communication section which carries out communication of information other than the call information, including an image to be displayed;

a first display section which is disposed in a phone main body to display the call information;

a second display section which displays details of the information including the image to be displayed;

an operation key unit which is attachable/detachable with respect to the phone main body and which inputs at least one of character information and instruction information; and a transmission/reception section which transmits/receives the at least one of character information and instruction information between the operation key unit and the phone main body;

wherein the operation key unit comprises:
   a capacitance input section which performs an instruction operation for the second display section on a rear surface side of the operation key unit with respect to an operation surface of the operation key unit; and
   an XY code conversion section which converts a signal from the capacitance input section into a signal to be transferred; and wherein the phone main body receives the signal to be transferred converted by the XY code conversion section via the transmission/reception section and comprises a control section to perform an instruction operation process of the second display section based on the received signal.

20. A cellular phone comprising:

a voice communication section which carries out voice communication and communication of call information;

an information communication section which carries out communication of information other than the call information, including an image to be displayed;

a first display section which is disposed in a phone main body to display the call information;

a second display section which displays details of the information including the image to be displayed;

an operation key unit which is attachable/detachable with respect to the phone main body and which inputs at least one of character information and instruction information; and a transmission/reception section which transmits/receives the at least one of character information and instruction information between the operation key unit and the phone main body;

wherein the operation key unit comprises:

a cross key section which performs an instruction operation of the second display section on a rear surface side of the operation key unit with respect to an operation surface of the operation key unit; and an XY code conversion section which converts a signal outputted from the cross key section into a signal to be transferred; and wherein the phone main body receives the signal to be transferred converted by the XY code conversion section via the transmission/reception section and comprises a control section to perform an instruction operation process of the second display section based on the received signal.

* * * * *